US012501053B2

(12) United States Patent
Skupin et al.

(10) Patent No.: US 12,501,053 B2
(45) Date of Patent: Dec. 16, 2025

(54) INTER-PREDICTION CONCEPT USING TILE-INDEPENDENCY CONSTRAINTS

(71) Applicant: Fraunhofer-Gesellschaft zur Foerderung der angewandten Forschung e.V., Munich (DE)

(72) Inventors: Robert Skupin, Berlin (DE); Yago Sánchez De La Fuente, Berlin (DE); Cornelius Hellge, Berlin (DE); Adam Wieckowski, Berlin (DE); Valeri George, Berlin (DE); Benjamin Bross, Berlin (DE); Thomas Schierl, Berlin (DE); Karsten Suehring, Berlin (DE); Thomas Wiegand, Berlin (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/328,866

(22) Filed: May 24, 2021

(65) Prior Publication Data
US 2021/0281855 A1 Sep. 9, 2021

Related U.S. Application Data

(63) Continuation of application No. PCT/EP2019/082435, filed on Nov. 25, 2019.

(30) Foreign Application Priority Data

Nov. 26, 2018 (EP) .................................... 18208418

(51) Int. Cl.
*H04N 19/00* (2014.01)
*H04N 19/105* (2014.01)
(Continued)

(52) U.S. Cl.
CPC ......... *H04N 19/159* (2014.11); *H04N 19/105* (2014.11); *H04N 19/139* (2014.11);
(Continued)

(58) Field of Classification Search
CPC ...................................................... H04N 19/00
See application file for complete search history.

(56) References Cited

U.S. PATENT DOCUMENTS

2007/0286282 A1* 12/2007 Haskell ................ H04N 19/159
375/240.15
2008/0008241 A1* 1/2008 Park ..................... H04N 19/615
375/240.16

(Continued)

FOREIGN PATENT DOCUMENTS

JP 2014-520477 8/2014
JP 2016-519516 6/2016

(Continued)

OTHER PUBLICATIONS

Bross, B., et al., "Suggested fix for MCTS SEI message", 27. JCT-VC Meeting; Mar. 31, 2017-Jul. 4, 2017; Hobart; (Joint Collaborative Team on Video Coding of ISO/IEC JTC1/SC29/WG11 and ITU-T SG.16); URL: http://wftp3.itu.int/avarch/jctvc-site/,,No. JCTVC-AA0042-v3, XP030118219, 3pp.

(Continued)

*Primary Examiner* — Maryam A Nasri
(74) *Attorney, Agent, or Firm* — Sage Patent Group

(57) ABSTRACT

Different concepts for improving video coding efficiency are described, many of them allow for video coding in a manner realizing tile-independent coding with reducing, however, the coding efficiency losses otherwise associated with the tile-dependency disruptions, with nevertheless merely marginally, if all, modifying the codec behavior alongside the tile boundaries.

20 Claims, 22 Drawing Sheets

(51) Int. Cl.
*H04N 19/139* (2014.01)
*H04N 19/159* (2014.01)
*H04N 19/176* (2014.01)
*H04N 19/196* (2014.01)
*H04N 19/577* (2014.01)

(52) U.S. Cl.
CPC ......... *H04N 19/176* (2014.11); *H04N 19/196* (2014.11); *H04N 19/577* (2014.11)

(56) References Cited

U.S. PATENT DOCUMENTS

| | | | |
|---|---|---|---|
| 2012/0195368 A1* | 8/2012 | Chien | H04N 19/51 375/E7.125 |
| 2013/0016785 A1* | 1/2013 | Wang | H04N 19/52 375/240.16 |
| 2013/0343461 A1 | 12/2013 | Lee et al. | |
| 2014/0119671 A1 | 5/2014 | Lim et al. | |
| 2014/0301464 A1 | 10/2014 | Wu | |
| 2016/0057441 A1* | 2/2016 | Skupin | H04N 19/463 375/240.25 |
| 2018/0098063 A1 | 4/2018 | Chen et al. | |
| 2020/0177911 A1 | 6/2020 | Aono | |

FOREIGN PATENT DOCUMENTS

| | | |
|---|---|---|
| JP | 2017-126272 | 7/2017 |
| JP | 2020-145484 | 9/2020 |
| KR | 10-2014-0057238 | 5/2014 |
| KR | 10-2018-0018388 | 2/2018 |

OTHER PUBLICATIONS

Notice of Reasons for Rejection, dated Oct. 4, 2022, Japanese patent application 2021-529678.

JVET-K0104-v5, Li Zhang et al., CE4-related: History-based Motion Vector Prediction, Joint Video Experts Team (JVET) of ITU-T SG 16 WP 3 and ISO/IEC JTC 1/SC 29/WG 11, 11th Meeting, Jul. 10-18, 2018, 7 pp.

JVET-J0026r1, Kiran Misra et al., "Description of SDR and HDR Video Coding Technology Proposal by Sharp and Foxconn," Joint Video Exploration Team (JVET) of ITU-T SG 16 WP 3 and ISO/IEC JTC 1/SC 29/WG 11, 10th Meeting, San Diego, US, Apr. 10-20, 2018, 70 pp.

JVET-K0189-v2, Huanbang Chen et al., Non-CE4: ATMVP Simplification, Joint Video Experts Team (JVET) of ITU-T SG 16 WP 3 and ISO/IEC JTC 1/SC 29/WG 11, 11th Meeting, Jul. 10-18, 2018, 4 pp.

* cited by examiner

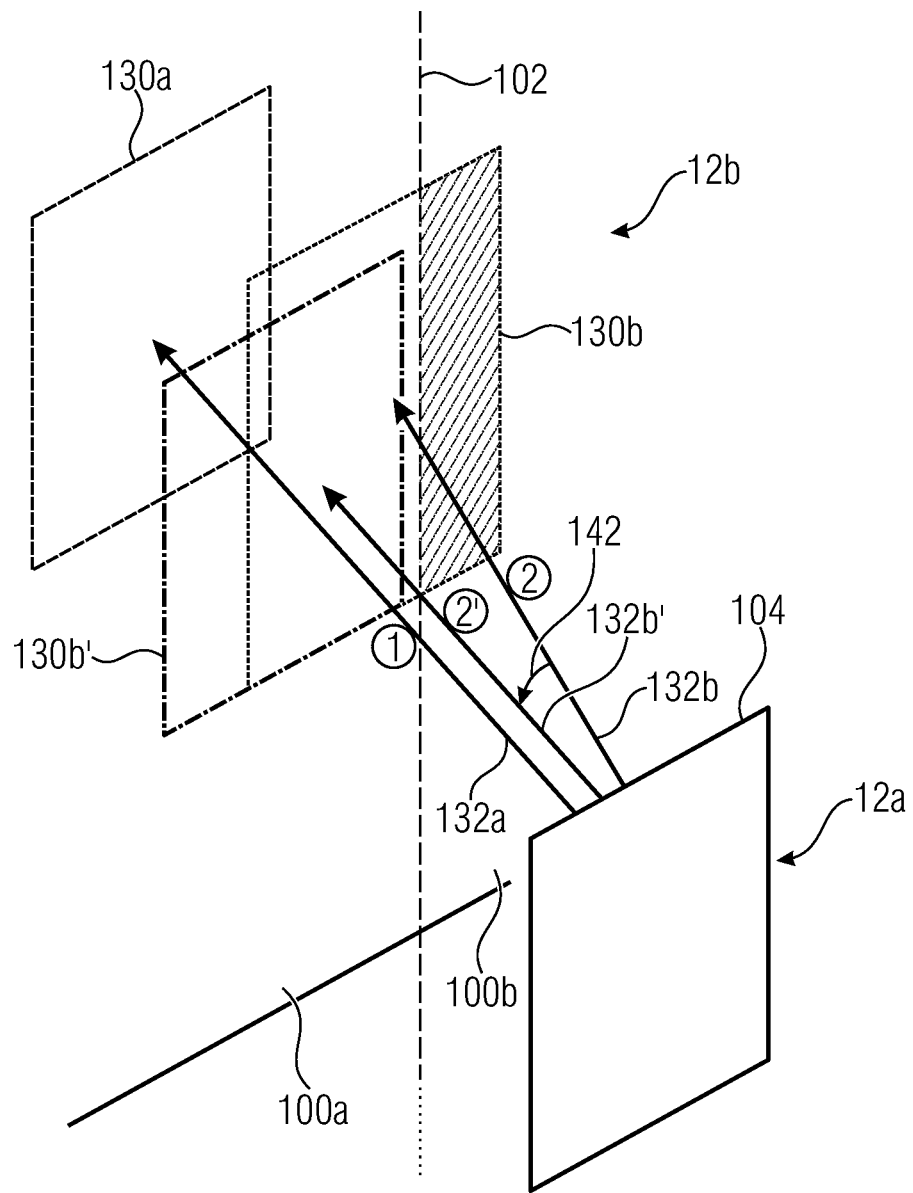
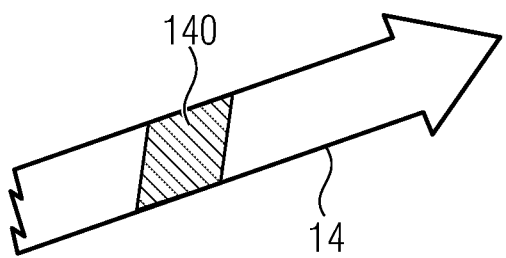
Fig. 9

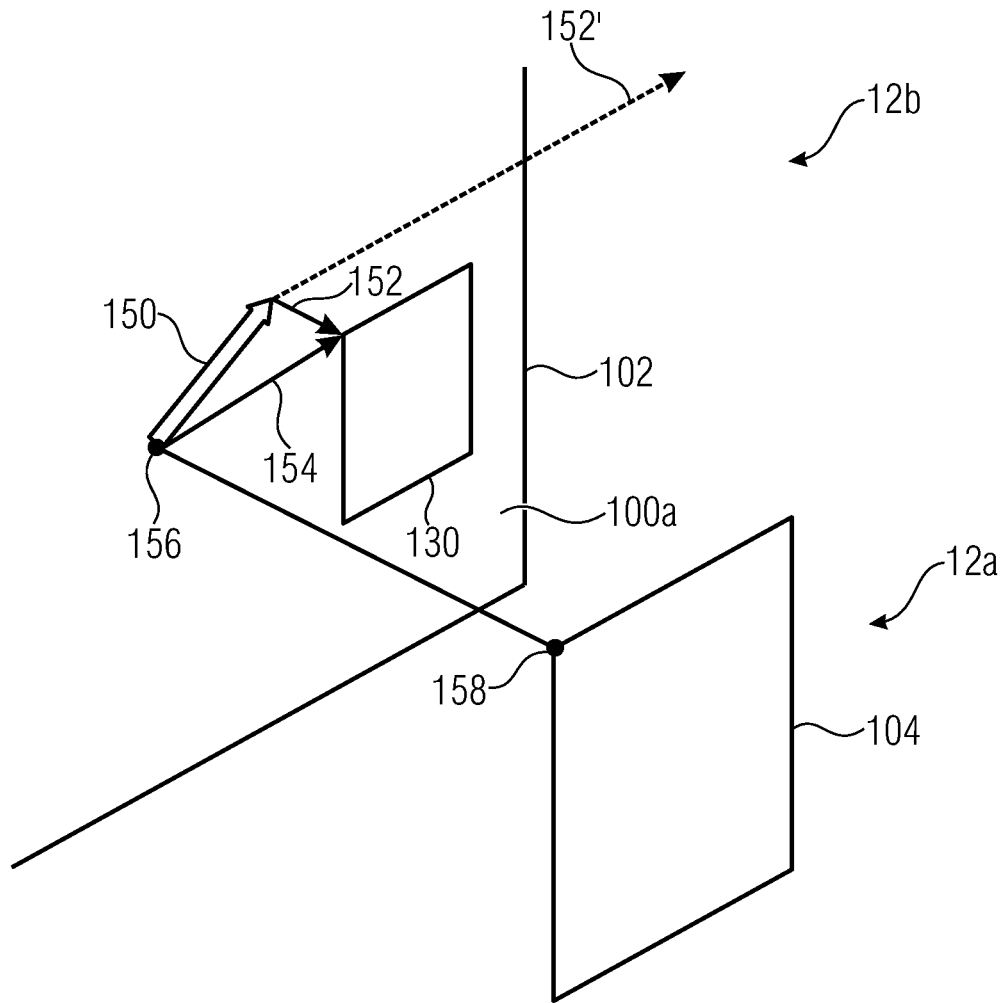
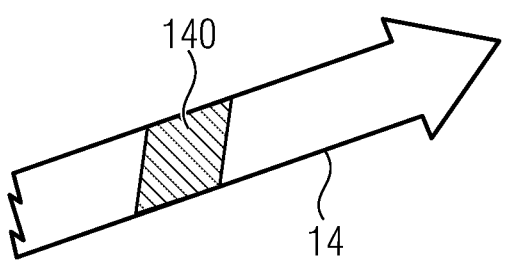
Fig. 10 ic # INTER-PREDICTION CONCEPT USING TILE-INDEPENDENCY CONSTRAINTS

CROSS-REFERENCE TO RELATED APPLICATIONS

This application is a continuation of copending International Application No. PCT/EP2019/082435, filed Nov. 25, 2019, which is incorporated herein by reference in its entirety, and additionally claims priority from European Application No. 18 208 418.6, filed Nov. 26, 2018, which is also incorporated herein by reference in its entirety.

BACKGROUND OF THE INVENTION

The present application is concerned with an inter coding concept for use in a block-based codec such as, for example, a hybrid video codec, especially with a concept allowing for tile-based coding, i.e. independent coding of tiles into which a video is spatially subdivided.

Existing application such as 360° video services based on the MPEG OMAF standard heavily rely on spatial video partitioning or segmentation techniques. In such applications, spatial video segments are transmitted to the client and jointly decoded in a manner adaptive to the current client viewing direction. Another relevant application that relies on spatial segmentation of the video plane is the parallelization of encoding and decoding operation, e.g. to facilitate the multi-core capabilities of modern computing platforms.

One such spatial segmentation technique is implemented in HEVC and known as tiles which divide the picture plane into segments forming a rectangular grid. The resulting spatial segments are coded independently with respect to entropy coding and intra-prediction. Furthermore, there exists means to indicate that the spatial segments are also coded independently with respect to state-of-the-art inter-prediction. For some applications as the ones listed above, having constraints in all three areas, i.e. entropy coding, intra- and inter-prediction, is vital.

However, as the ever-evolving art of video coding brings along new coding tools of which many relate to the field of inter-prediction, i.e. many tools incorporate new dependencies to previously coded pictures or different areas within the currently coded picture, appropriate care has to be taken on how to guarantee independence in all these mentioned areas.

Till now, it is the encoder which takes care that the coding parameters using the just-mentioned coding tools being available, are set in such a manner that the independent coding of the tiles of the video is adhered to. The decoder "relies on" a respective guarantee signaled by the encoder to the decoder via the bitstream.

It would be worthwhile to have a concept at hand which enables tile-independent coding in a manner which leads to less coding efficiency losses due to the coding dependency disruption due to the tile partition with, nevertheless, causing merely marginal modifications of the codec behavior alongside the boundaries.

Thus, I would be favorable to have a concept at hand which allows for video coding in a manner realizing tile-independent coding with reducing, however, the coding efficiency losses otherwise associated with the tile-dependency disruptions, with nevertheless merely marginally, if at all, modifying the codec behavior alongside the tile boundaries.

SUMMARY

An embodiment may have a block-based video decoder supporting motion-compensated prediction configured to derive motion information for a predetermined inter-predicted block of a current picture of a video, which locates a patch in a reference picture, from which the predetermined inter-predicted block is to be predicted, from a data stream into which the video is coded, depending on a position of boundaries between tiles, into which the video is spatially partitioned, and predict the predetermined inter-predicted block using the motion information from the patch of the reference picture.

Another embodiment may have a block-based video decoder supporting motion-compensated bi-directional prediction and having a bi-directional optical flow tool for improving the motion-compensated bi-directional prediction, wherein the block-based video decoder is configured to deactivate the bi-directional optical flow tool depending on whether at least one of first and second patches of a predetermined inter-predicted block of a current picture to be subject to motion-compensated bi-directional prediction, which are displaced relative to the predetermined inter-predicted block according to first and second motion vectors signaled in the data stream for the predetermined inter-predicted block, crosses boundaries of a tile of the current picture by which the predetermined inter-predicted block is comprised, or use boundary padding so as to fill a portion of first and second patches of a predetermined inter-predicted block of a current picture to be subject to the motion-compensated bi-directional prediction, which are displaced relative to the predetermined inter-predicted block according to first and second motion vectors signaled in the data stream for the predetermined inter-predicted block, which portion lies beyond boundaries of a tile of the current picture, by which the predetermined inter-predicted block is comprised.

Another embodiment may have a block-based video encoder for encoding a video into a data stream and supporting motion-compensated prediction configured to determine motion information for a predetermined inter-predicted block of a current picture of a video, which locates a patch in a reference picture, from which the predetermined inter-predicted block is to be predicted, in a manner so that the patch is within, and does not cross, boundaries of a tile by which the predetermined inter-predicted block is comprised, predict the predetermined inter-predicted block using the motion information from the patch of the reference picture, encode the motion information into the data stream, so that a signalization thereof into the data stream is to be performed depending on a position of boundaries between tiles, into which the video is spatially partitioned.

Still another embodiment may have a block-based video encoder supporting motion-compensated bi-directional prediction and having a bi-directional optical flow tool for improving the motion-compensated bi-directional prediction, wherein the block-based video encoder is configured to deactivate the bi-directional optical flow tool depending on whether at least one of first and second patches of a predetermined inter-predicted block of a current picture to be subject to motion-compensated bi-directional prediction, which are displaced relative to the predetermined inter-predicted block according to first and second motion vectors signaled in the data stream for the predetermined inter-predicted block, crosses boundaries between tiles, into which the video is spatially partitioned, or use boundary padding so as to fill a portion of first and second patches of a predetermined inter-predicted block of a current picture to be subject to the motion-compensated bi-directional prediction, which are displaced relative to the predetermined inter-predicted block according to first and second motion vectors signaled in the data stream for the predetermined inter-predicted block, which portion lies beyond boundaries of a tile of the current picture, by which the predetermined inter-predicted block is comprised.

According to another embodiment, a method for block-based video decoding that supports motion-compensated prediction may have the steps of: deriving motion information for a predetermined inter-predicted block of a current picture of a video, which locates a patch in a reference picture, from which the predetermined inter-predicted block is to be predicted, from a data stream into which the video is coded, depending on a position of boundaries between tiles, into which the video is spatially partitioned, and predicting the predetermined inter-predicted block using the motion information from the patch of the reference picture.

According to another embodiment, a method for block-based video decoding that supports motion-compensated bi-directional prediction and having a bi-directional optical flow tool for improving the motion-compensated bi-directional prediction, may have the steps of: deactivating the bi-directional optical flow tool depending on whether at least one of first and second patches of a predetermined inter-predicted block of a current picture to be subject to motion-compensated bi-directional prediction, which are displaced relative to the predetermined inter-predicted block according to first and second motion vectors signaled in the data stream for the predetermined inter-predicted block, crosses boundaries of a tile of the current picture by which the predetermined inter-predicted block is comprised, or using boundary padding so as to fill a portion of first and second patches of a predetermined inter-predicted block of a current picture to be subject to the motion-compensated bi-directional prediction, which are displaced relative to the predetermined inter-predicted block according to first and second motion vectors signaled in the data stream for the predetermined inter-predicted block, which portion lies beyond boundaries of a tile of the current picture, by which the predetermined inter-predicted block is comprised.

According to still another embodiment, a method for block-based video encoding for encoding a video into a data stream and supporting motion-compensated prediction may have the steps of: determining motion information for a predetermined inter-predicted block of a current picture of a video, which locates a patch in a reference picture, from which the predetermined inter-predicted block is to be predicted, in a manner so that the patch is within, and does not cross, boundaries of a tile by which the predetermined inter-predicted block is comprised, predicting the predetermined inter-predicted block using the motion information from the patch of the reference picture, encoding the motion information into the data stream, so that a signalization thereof into the data stream is to be performed depending on a position of boundaries between tiles, into which the video is spatially partitioned.

According to another embodiment, a method for block-based video encoding that supports motion-compensated bi-directional prediction and having a bi-directional optical flow tool for improving the motion-compensated bi-directional prediction, may have the steps of: deactivating the bi-directional optical flow tool depending on whether at least one of first and second patches of a predetermined inter-predicted block of a current picture to be subject to motion-compensated bi-directional prediction, which are displaced relative to the predetermined inter-predicted block according to first and second motion vectors signaled in the data stream for the predetermined inter-predicted block, crosses boundaries between tiles, into which the video is spatially partitioned, or sing boundary padding so as to fill a portion of first and second patches of a predetermined inter-predicted block of a current picture to be subject to the motion-compensated bi-directional prediction, which are displaced relative to the predetermined inter-predicted block according to first and second motion vectors signaled in the data stream for the predetermined inter-predicted block, which portion lies beyond boundaries of a tile of the current picture, by which the predetermined inter-predicted block is comprised.

Another embodiment may have a data stream encoded by any of the above inventive methods for block-based video encoding.

Still another embodiment may have a non-transitory digital storage medium having stored thereon a computer program for performing the above inventive method for block-based video decoding, when the program runs on a computer.

Generally speaking, it is a finding of the present application to have found out that a more efficient way of allowing for a tile-independent coding of video material is enabled if the obligation to adhere to the tile-independent coding of the video is, partially, inherited from the encoder to the decoder or, in other words, is partially co-attended to by the decoder so that the encoder may make use of that co-attention. To be more precise, in accordance with embodiments of the present application, the decoder is provided with a tile boundary awareness. That is, the decoder acts in a manner depending on a position of boundaries between tiles into which the video is spatially partitioned. In particular, this inter-tiled boundary awareness also relates to the decoder's derivation of motion information from the data stream. This "awareness" leads to the decoder recognizing signaled motion information conveyed in the data stream which would, if applied as signaled, lead to compromising the tile-independency requirement, and accordingly, to the decoder mapping such signaled motion information, which would compromise the tile-independence, to allowed motion information states corresponding to motion information leading, when being used for inter-prediction, not to compromising the tile-independency. The encoder may rely on this behavior, i.e., is aware of the decoder's awareness, and, especially, the redundancy of signalable motion information states resulting from the decoder's obeyance or enforcement of the tile independence constraints. In particular, the encoder may exploit the decoder's tile-independency constraint enforcement/obeyance in order to select, among signalable motion information states leading, due to the decoder behavior, to the same motion information at the decoder side, respectively, the one using less bitrate such as, for instance, one associated with a signaled motion information prediction residual of being zero. Thus, at the encoder side, the motion information for a certain inter-predicted block is determined to conform to the constraint that the patch from which the certain inter-predicted block is to be predicted, is within, and does not cross, boundaries of a tile by which the certain inter-predicted block is comprised, i.e., within which the certain inter-predicted block is located, but when encoding the motion information of that certain inter-predicted block into the data stream, the encoder exploits the fact that the derivation thereof from the data stream is to be performed depending on the tile boundaries, i.e., entails the just-outlined tile boundary awareness.

In accordance with embodiments of the present application, the motion information comprises a motion vector for a certain inter-predicted block and the tile boundary awareness of the decoder processing relates to the motion vector. In particular, in accordance with embodiments of the present application, the decoder enforces the tile independency constraints with respect to predictively coded motion vectors. That is, according to these embodiments, the decoder obeys or enforces the constraint on the motion vector so as to result in the patch from which the inter-predicted block is to be predicted exceeding the boundaries of the tile within which the inter-predicted block is located, at the time of determining the motion vector on the basis of a motion vector predictor/prediction on the one hand and motion information prediction on residual transmitted in the data stream for the inter-predicted block, on the other hand. That is, the decoder would perform the just-mentioned obeyance/enforcement by use of a mapping which is non-invertible: instead of, for instance, mapping all combinations of motion information prediction and motion information prediction residual to the sum thereof in order to yield the motion vector to be finally used, this mapping would redirect all possible combinations of motion vector prediction and motion vector prediction residual the sum of which would lead to a motion vector associated with a patch exceeding the current tile's boundaries, i.e., the boundaries of the tile within which the current inter-predicted block is located, towards motion vectors the associated patches of which do not exceed the current tile's boundary. As a consequence, the encoder may exploit an ambiguity in signaling certain motion vectors for a predetermined inter-predicted block and may, for instance, chose for this inter-predicted block the signaling of a motion vector prediction residual leading to the lowest bitrate. This might be, for instance, a motion vector difference of zero.

In accordance with a variant of the above-outlined idea of providing the decoder with the capability of at least partially adopting the tile-boundary awareness for enforcing the tile-independency constraints for which otherwise the encoder is responsible only, the decoder applies the tile-independency constraint enforcement onto one or more motion information predictors for a certain inter-predicted block, rather than onto the resulting motion information resulting from combining the motion information prediction and the motion information prediction residual. Both, encoder and decoder perform the tile-independency enforcement on the motion information predictor(s) so that both use the same motion information predictor(s). Signalization ambiguity and the possibility of exploiting the latter in order to minimize bitrate is not an issue here. However, preparing the motion information predictor(s) for certain inter-predicted block in advance, i.e., before using same for motion information predictive coding/decoding, enables to tailor or "focus" the available motion vector predictor(s) for a certain inter-predicted block to solely point to patch locations within the current tile instead of wasting one or more motion information predictor(s) pointing to conflicting patch locations, i.e., patch locations exceeding the current tile's boundaries the usage of which for predictively encoding the motion information for the inter-predicted block would then, anyway, use the signalization of a non-zero motion information prediction residual so as to redirect the conflicting motion information predictor to a patch location in the inner of the current tile. Even here, the motion information may be a motion vector.

Related to the latter variant, but nevertheless being different therefrom, further embodiments of the present application aim at avoiding motion information prediction candidates for a certain inter-predicted block the application of which directly, i.e., with a zero motion information prediction residual, would lead to a compromising of the tile-independency constraint. That is, other than the previous variant, such a motion information prediction candidate would simply not be used for populating a motion information prediction candidate list for a currently predicted inter-predicted block. Encoder and decoder would act the same. No redirection is performed. These predictors are simply left off. That is, the establishment of the motion information prediction candidate list would be made in the same inter-tile boundary aware manner. In this manner, all members signalable for the currently coded inter-predicted block would concentrate onto non-conflicting motion information prediction candidates. Thereby, the complete list would be signalable by way of a point in the data stream, for instance, at no signalable state of such a pointer would have to be "wasted" for motion information prediction candidates forbidden to be signaled in order to conform to the tile-independency constraint as either the motion information prediction candidate pointed to would be in conflict with this constraint, or any preceding, in rank position, motion information prediction candidate.

Similarly, further embodiments of the present application aim at avoiding populating a motion information prediction candidate list with candidates the origin thereof resides in blocks located outside the current tile, i.e., the tile within which the current inter-predicted block is located. Accordingly, and in accordance with these embodiments, the decoder as well as the encoder checks whether the inter-predicted block adjoins a predetermined side such as the lower and/or right hand side, of the current tile and if so, a first block in a motion information reference picture is identified and the list is populated with a motion information prediction candidate derived from motion information of this first block, and if not, a second block in the motion information reference picture is identified and the motion information prediction candidate list is populated, instead, with a motion information prediction candidate derived from the second block's motion information. For instance, the first block may be the one inheriting a location co-located to a first alignment location inside the current inter-predicted block, while the second block is the one containing a location co-located to a second predetermined location lying outside the inter-predicted block, namely offset relative to the inter-predicted block along a direction perpendicular to the predetermined side.

In accordance with a further variant of the above-outlined idea of the present application, motion information prediction candidate list construction/establishment is made in a manner so as to shift motion information prediction candidates the origin of which is liable to be in conflict with the tile-independency constraint, i.e., the origin of which lies outside the current tile, towards the end of the motion information prediction candidate list. By this manner, the signalization of pointers into the motion information prediction candidate list at the encoder side is not restricted too much. In other words, the pointers sent for a certain inter-predicted block and signalizing the motion information prediction candidate actually to be used for a current inter-predicted block, indicates this motion information candidate actually to be used by the rank position in the motion information prediction candidate list. By shifting motion information prediction candidates in the list which might be unavailable as their origin is located outside the current tile, so as to occur at the end, or at least later on, in the motion-information prediction candidate list, i.e. at higher ranks, all the motion information prediction candidates preceding the latter in the list are still signalable by the encoder and accordingly, their repertoire of motion information prediction candidates available for predicting the current block's motion information is still larger than compared to not shifting such "problematic" motion information prediction candidates towards the end of the list. In accordance with some embodiments relating to the just-outlined aspect, the populating of the motion information prediction candidate list in a manner so as to shift "problematic" motion information prediction candidates towards the end of the list is performed in the tile boarder aware manner at encoder and decoder. In this manner, the slight coding efficiency penalty associated with this shifting of potentially more likely to be more effected motion information prediction candidates towards the end of the list is restricted to areas of the pictures of the video alongside the tile boundaries. In accordance with an alternative, however, the shifting of "problematic" motion information prediction candidates towards the end of the list is performed irrespective of the current block lying alongside any tile boundary or not. While slightly reducing the coding efficiency, the latter alternative might improve the robustness and ease the coding/decoding procedure. The "problematic" motion information prediction candidates might be ones derived from blocks in the reference picture or might be ones derived from a motion information history management.

In accordance with a further embodiment of the present application, decoder and encoder determine a temporal motion information prediction candidate in a tile-boundary aware manner by enforcing tile-independency constraints with respect to a predicted motion vector used, in turn, to point to a block in the motion information reference picture, the motion information of which is used to form a temporal motion information prediction candidate in the list. The predicted motion vector is clipped to stay within the current tile or point to a position within the current tile. The availability of such a candidate is, accordingly, under guarantee within the current tile so that the list conformity with the tile-independency constraint is conserved. In accordance with an alternative concept, instead of clipping the motion vector, a second motion vector is used if the first motion vector points outside the current tile. That is, the second motion vector is used to locate the block on the basis of the motion information of which the temporal motion information prediction candidate is formed, if the first motion vector points outside the tile.

In accordance with even further embodiments, the above-outlined idea of providing a decoder with a tile-boundary awareness in order to assist in enforcing tile-independency constraints, a decoder which supports a motion-compensative prediction according to which motion information is coded in the data stream for a certain inter-predicted block and the decoder derives therefrom a motion vector for each sub-block of sub-blocks into which this inter-predicted block is partitioned, performs either the derivation of the sub-block motion vectors or the prediction of each sub-block using the derived motion vectors or both depending on a position of boundaries between the tiles. In this manner, the cases where such effective coding mode could not be used by the encoder as it would be in conflict with the tile-independency constraint, is fairly reduced.

In accordance with a further aspect of the present application, a codec which supports motion-compensated bi-directional prediction and involves a bi-directional optical flow tool at encoder and decoder for improving the motion-compensated bi-directional prediction, is made compliant with tile-independent coding by either providing encoder and decoder with an automatic deactivation of the bi-directional optical flow tool in cases where the application of the tool would lead to a conflict with the tile-independency constraint, or boundary padding would be used in order to determine regions of a patch from which a certain bi-predictively inter-predicted block is predicted using the bi-directional optical flow tool as predicted, which lie outside the current tile.

Another aspect of the present application relates the population of a motion information predictor candidate list using a motion information history list storing previously used motion information. This aspect may be used irrespective of using tile-based coding or not. This aspect seeks to provide a video codec of higher compression efficiency by rendering the selection of the motion information predictor candidate out of the motion information history list by way of which an entry currently to be populated in the candidate list is to be filled, dependent on those motion information predictor candidates by which the motion information predictor candidate list is populated so far. The aim of this dependency is to select motion information entries in the history list more likely the motion information of which is further away from the motion information predictor candidates by which the candidate list is populated so far. An appropriate distance measure may be defined on the basis of, for instance, motion vectors comprised by the motion information entries in their history list and the motion information predictor candidates in the candidate list, respectively, and/or reference picture indices comprised by same. By this manner, the population of the candidate list using a history based candidate leads to a higher degree of "refreshment" of the resulting candidate list so that the likelihood that the encoder finds a good candidate in the candidate list in terms of great distortion optimization is higher than compared to selecting the history-based candidate purely according to its rank in the motion information history list, i.e., how newly same has been entered into the motion information history list. This concept may in fact be also applied to any other motion information predictor candidate which is currently to be selected out of a set of motion information predictor candidates in order to populate the motion information predictor candidate list.

BRIEF DESCRIPTION OF THE DRAWINGS

Embodiments of the present application are described below with respect to the figures, among which:

FIG. 8 shows a schematic diagram illustrating the decoder's obeyance/enforcement feature according to respective embodiments;

FIG. 9 shows a schematic diagram illustrating the decoder's obeyance/enforcement feature and the usage of a non-invertible mapping for realizing the associated re-direction of motion data according to some embodiments of the present application;

FIG. 10 shows a schematic diagram illustrating predictive motion information coding/decoding to illustrate the possibility of applying the decoder's obeyance/enforcement feature onto the signaled or finally reconstructed motion information state or a motion information prediction;

DETAILED DESCRIPTION OF THE INVENTION

The following description of the figures starts with a presentation of a description of encoder and decoder of a block-based predictive codec for coding pictures of a video in order to form an example for a coding framework into which embodiments for an inter-prediction codec may be built in. The former encoder and decoder are described with respect to FIGS. 1 to 3. Thereinafter the description of embodiments of the inter-prediction concepts of the present application are presented. They may be combined or used in combination. In particular, all concepts described later may by combined built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 1:
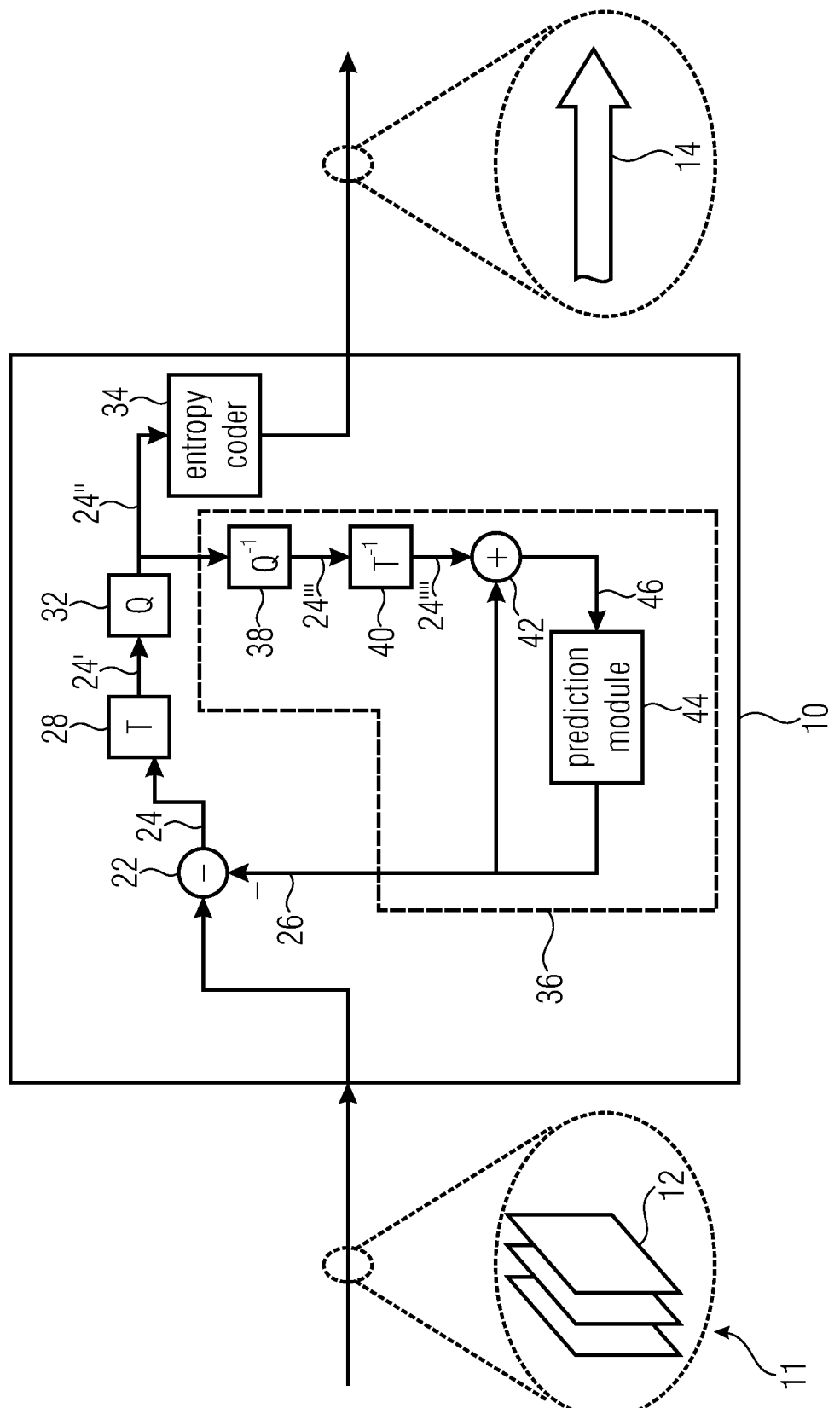
FIG. 1 shows a block diagram of a block-based video encoder as an example for an encoder where inter prediction concepts according to embodiments of the present application could be implemented.
Figure 2:
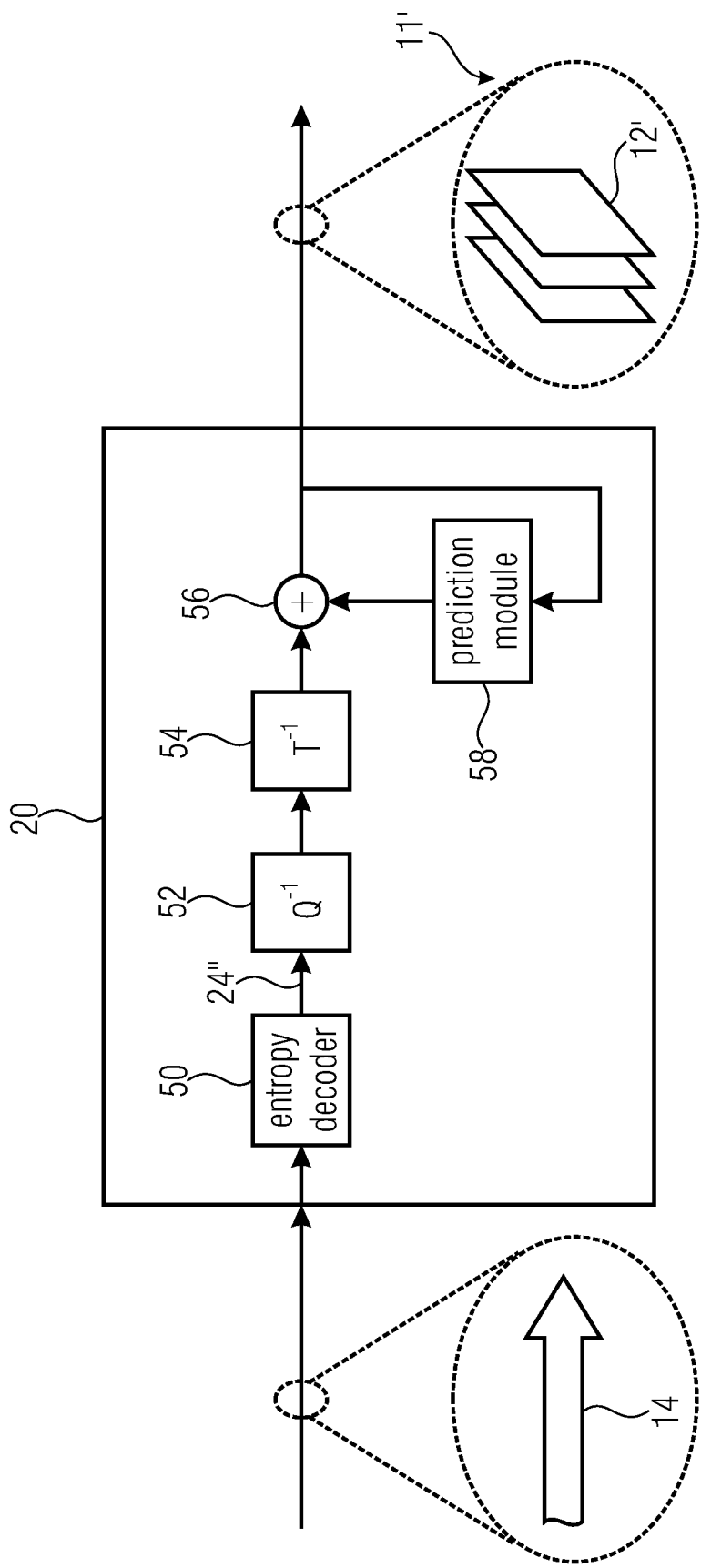
FIG. 2 shows a block diagram of a block-based video decoder, which fits to the encoder of FIG. 1, as an example for an encoder where inter prediction concepts according to embodiments of the present application could be implemented.

FIG. 1 shows an apparatus for predictively coding a video 11 composed of a sequence of pictures 12 into a data stream 14 using, exemplarily, transform-based residual coding. The apparatus, or encoder, is indicated using reference sign 10. FIG. 2 shows a corresponding decoder 20, i.e. an apparatus 20 configured to predictively decode a video 11' composed of a sequence of pictures 12' from the data stream 14 also using transform-based residual decoding, wherein the apostrophe has been used to indicate that the video 11' and pictures 12' as reconstructed by decoder 20 deviate from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. the current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" decoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra prediction, and/or temporal prediction, i.e. inter prediction.

Likewise, decoder 20 may be internally composed of components corresponding to, and inter-connected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with deriving tilt and offset of the plane defined by the two-dimensional linear function on the basis of the neighboring samples. Compared thereto, inter-coded blocks may be predicted, for instance, temporally. For inter-coded blocks, motion information may be signaled within the data stream: The motion information may comprise vectors indicating the spatial displacement of the portion of a previously coded picture of the video to which picture 12 belongs, at which the previously coded/decoded picture is sampled in order to obtain the prediction signal for the respective inter-coded block. More complex motion models may be used as well. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded blocks, and optional further parameters such as parameters controlling and signaling the subdivision of picture 12 and 12', respectively, into the blocks. The decoder 20 uses these parameters to subdivide the picture in the same manner as the encoder did, to assign the same prediction modes to the blocks, and to perform the same prediction to result in the same prediction signal.

Figure 3:
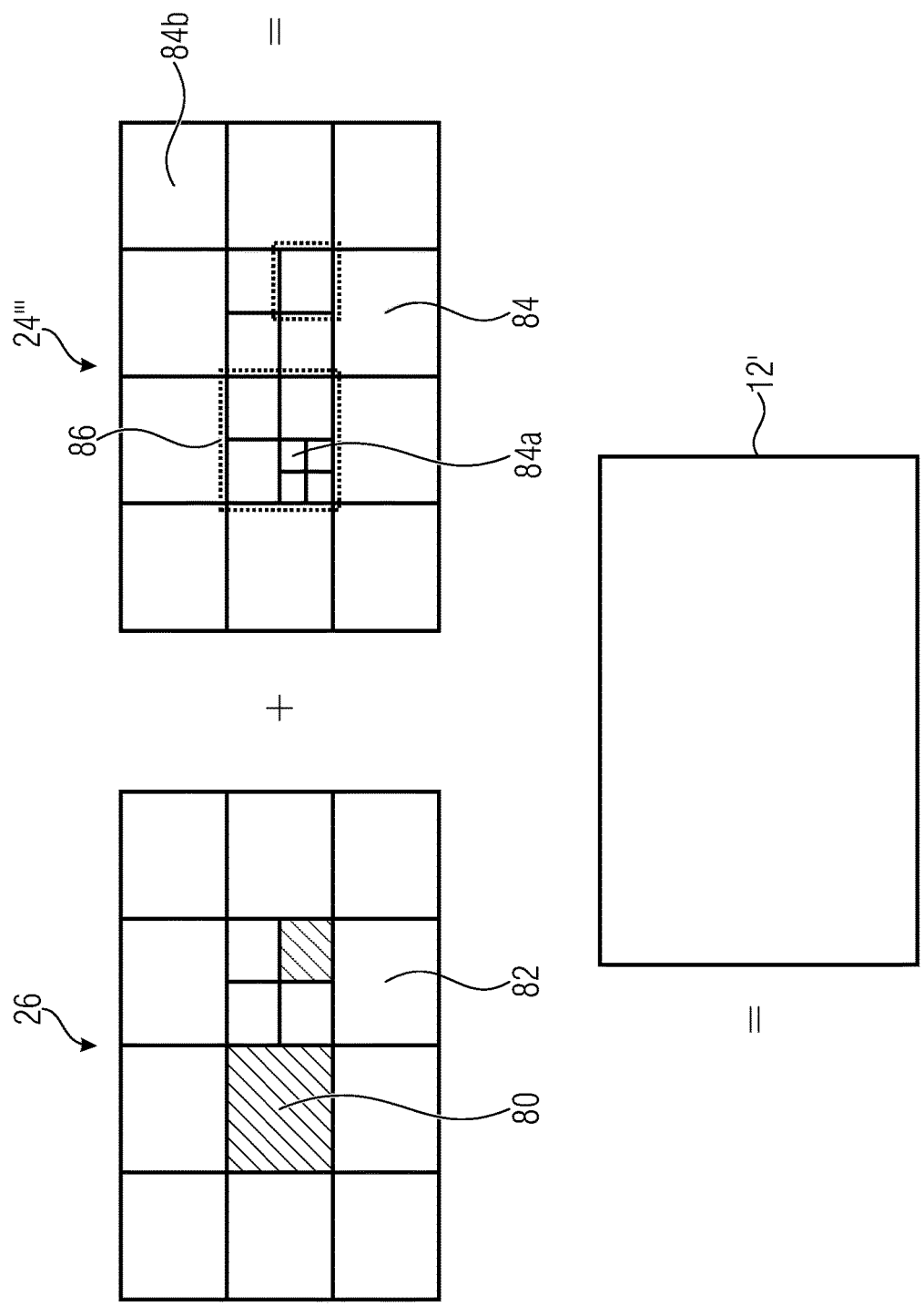
FIG. 3 shows a schematic diagram illustrating an example for a relationship between the prediction residual signal, the prediction signal and the reconstructed signal so as to illustrate possibilities of setting subdivisions for coding mode selection, transform selection and transform performance, respectively.

FIG. 3 illustrates the relationship between the reconstructed signal, i.e. the reconstructed picture 12', on the one hand, and the combination of the prediction residual signal 24'''' as signaled in the data stream, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of blocks or blocks, or a multi-tree subdivision of picture 12 into leaf blocks of varying size, such as a quadtree subdivision or the like, into blocks, wherein a mixture thereof is illustrated in FIG. 3 where the picture area is first subdivided into rows and columns of tree-root blocks which are then further subdivided in accordance with a recursive multi-tree sub-divisioning. Again, data stream 14 may have an intra-coding mode coded thereinto for intra-coded blocks 80, which assigns one of several supported intra-coding modes to the respective intra-coded block 80. For inter-coded blocks 82, the data stream 14 may have motion information coded thereinto such as motion information including one or more motion vectors. Details are set out hereinbelow. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or a hierarchically lower layer in the case of encoder and decoder being scalable encoders and decoders, respectively. The prediction residual signal 24"" in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one sub-divisioning into coding blocks 80 and 82, respectively, and another subdivision into blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80/82 so that any border between two blocks of blocks 80 and 82 overlays a border between two blocks 84, or alternatively speaking each block 80/82 either coincides with one of the transform blocks 84 or coincides with a cluster of transform blocks 84. However, the subdivisions may also be determined or selected independent from each other so that transform blocks 84 could alternatively cross block borders between blocks 80/82. As far as the subdivision into transform blocks 84 is concerned, similar statements are thus true as those brought forward with respect to the subdivision into blocks 80/82, i.e. the blocks 84 may be the result of a regular subdivision of picture area into blocks/blocks, arranged in rows and columns, the result of a recursive multi-tree sub-divisioning of the picture area, or a combination thereof or any other sort of blockstation. Just as an aside, it is noted that blocks 80, 82 and 84 are not restricted to being of quadratic, rectangular or any other shape.

In the embodiments described below, an inter-predicted block 104 is representatively used to describe the specific details of the respective embodiment. This block 104 is may be one of the inter-predicted blocks 82. The other blocks mentioned in the subsequent figures may be any of the blocks 80 and 82.

FIG. 3 illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 3, the transform segments 84 shall have the following significance. Transformer 28 and inverse transformer 54 perform their transformations in units of these transform segments 84. For instance, many codecs use some sort of DST or DCT for all transform blocks 84. Some codecs allow for skipping the transformation so that, for some of the transform segments 84, the prediction residual signal is coded in in the spatial domain directly. However, in accordance with embodiments described below, encoder 10 and decoder 20 are configured in such a manner that they support several transforms. For example, the transforms supported by encoder 10 and decoder 20 could comprise:
DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:
Inverse DCT-II (or inverse DCT-III)
Inverse DST-IV
Inverse DCT-IV
Inverse DST-VII
Identity Transformation (IT)

The subsequent description provides more details on how inter-prediction could be implemented in encoder 10 and decoder 20. All other modes described above could be supported additionally, individually or all, such as the intra-prediction modes mentioned above. The residual coding could be done differently, such as in spatial domain.

As already outlined above, FIGS. 1-3 have been presented as examples for an encoder which performs block-based video encoding using one or more of the concepts outlined in more detail below. The details set forth below may be transferred to the encoder of FIG. 1 or to another block-based video encoder so that the latter would be different from the encoder of FIG. 1 such as, for instance, in that same does not support intra-prediction, or in that the sub-division into blocks 80 and/or 82 is performed in a manner different than exemplified in FIG. 3, or even in that this encoder does not use transform prediction residual coding with coding the prediction residual, for instance, in spatial domain directly instead. Likewise, decoders according to embodiments of the present application may perform block-based video decoding from data stream 14 using the any inter-prediction coding concept further outlined below, but may differ, for instance, from the decoder 20 of FIG. 2 in that same does not support intra-prediction, or in that same sub-divides picture 12' into blocks in a manner different than described with respect to FIG. 3 and/or in that same does not derive the prediction residual from the data stream 14 in transform domain, but in spatial domain, for instance.

Before, however, attending to the description of embodiments, the ability to code a video in a form partitioned into tiles and a manner coding/decoding the tiles independently from each other, is explained. Further, a detailed description of further coding tools is described, which were not discussed so far, and which may selectively be used in accordance with embodiments outlined below, with nevertheless maintaining the mutual tile coding independency.

Figure 4:
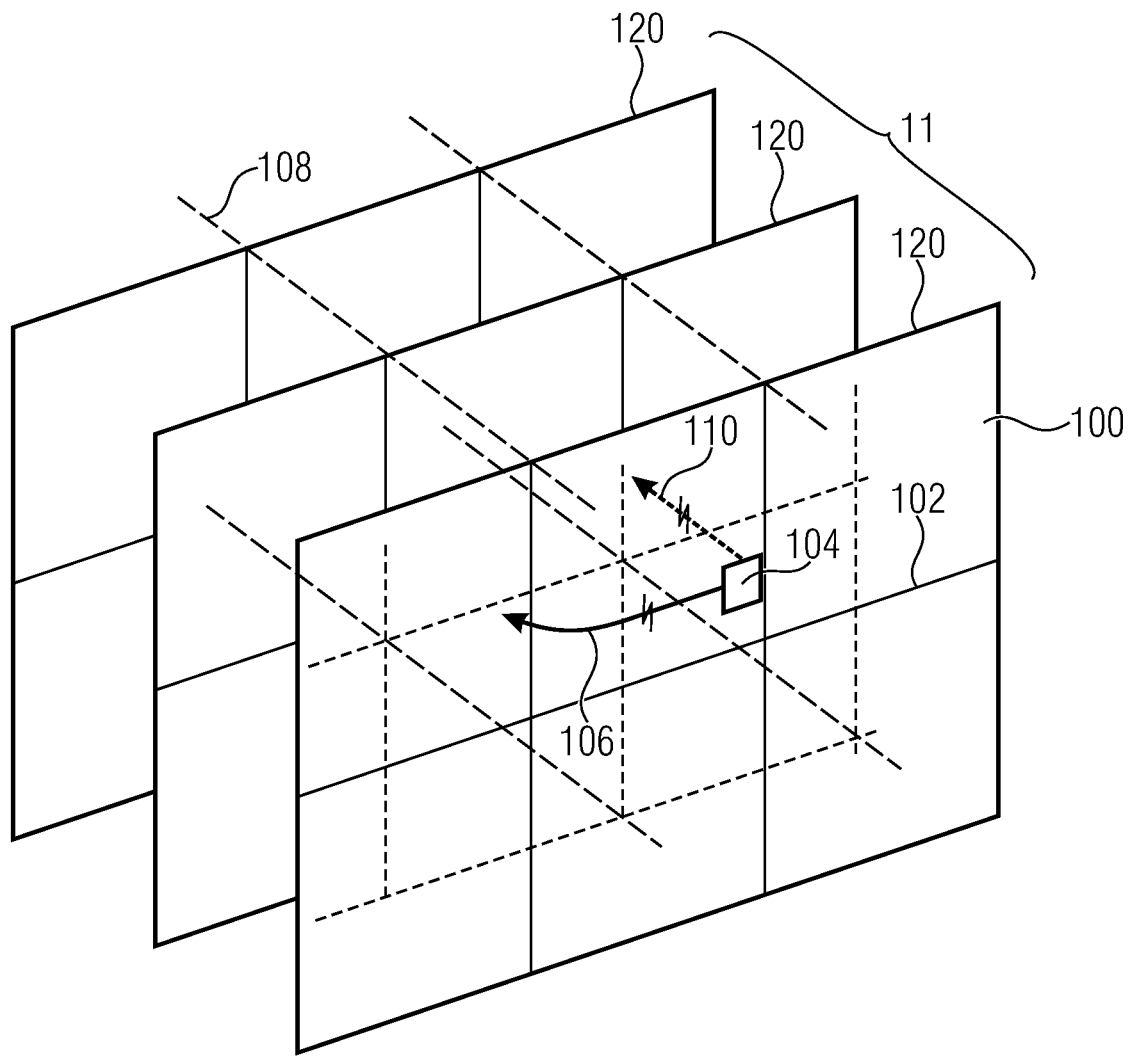
FIG. 4 shows a schematic diagram illustrating an exemplary partitioning of a video into tiles and the general aim of tile-independent coding.

Thus, after having described a potential implementation of block-based video encoders and video decoders, FIG. 4 is used to illustrate the concept of tile-independent coding. Tile-based independent coding may represent just one of several coding settings for the encoder. That is, the encoder may be set to adhere to tile-independent coding or may be set to not adhere to tile-independent coding. Naturally, it could be that the video encoder inevitably applies tile-independent coding.

In accordance with tile-independent coding, the pictures of the video 11 are partitioned into tiles 100. In FIG. 4, illustratively, merely three pictures 12a, 12b and 12c out of video 11 are shown and they are exemplarily shown to be partitioned into six tiles 100, respectively, although a partition into any other number of tiles would be feasible as well such as two or more tiles. Further, although FIG. 4 illustrates that the tile partitioning into tiles 100 is done in a manner so that the tiles 100 within one picture are regularly arranged in rows and columns with each tile 100 being a rectangular portion of the respective picture and the boundaries between the tiles 100 forming straight lines 102 leading through pictures 12a to 12c, it should be noted that alternative solutions exist as well where the tiles have another shape. It may be, that the partitioning of each picture 12 into blocks as explained with respect to FIG. 3 for sake coding the respective picture and decoding same, respectively, is aligned to tile boundaries 102 and that none of the coding blocks, prediction blocks and/or transform blocks, crosses and tile boundary 102, but rather are exclusively in one of the tiles 100 of the respective picture. For instance, the tile partitioning may be done in a manner aligned with a partitioning of pictures 12 into tree root blocks, i.e. blocks which are individually subdivided by the encoder into blocks 80/82 by way of recursive multi-tree partitioning, to which also the representatively shown block 104 belongs, and which individual subdivision is signaled to the decoder in the data stream.

Tile-independent coding means the following: the encoding of a respective portion of a tile, such as exemplarily shown for block 104 in FIG. 4, is done in a manner independent from any other tile within block 104 is not located. This coding independency does not only pertain to other tiles of the same picture, i.e., other tiles in the same picture which block 104 is part of, which intra-picture independency is illustrated in FIG. 4 using an exemplary arrow 106: This arrow 106 shown as being interrupted to show that the coding of block 14 does not depend on any other tile in the same picture. The coding independency also relates to coding dependencies with respect to other pictures: all pictures 12a to 12c of video 11 are partitioned into the tiles 100 in the same manner. Thus, each tile 100 of a certain picture 12a has a corresponding, co-located tile in all other pictures. A "tile" does, accordingly, not only describe a spatial segment of a certain picture such as the segment of picture 12a of FIG. 4 containing block 104, but also the spatiotemporal segment of video 11 composed of all co-located tiles of all pictures of the video which are co-located to this tile in the certain picture. In FIG. 4, this spatiotemporal segment is illustrated by dashed lines with respect to the tile containing block 104. When coding block 104, the encoder will, accordingly, also restrict coding dependencies to other pictures than picture 12a containing block 104 in a manner so as to not cause coding dependencies to tiles outside the spatiotemporal segment 108. In FIG. 4, this is illustrated by interrupted arrow 110 which points from the tile containing block 104 to a different tile in a reference picture 12b.

The concept and embodiments outlined further below, present possibilities as to how to guarantee among encoder and decoder as to how to avoid coding dependencies between different tiles of different pictures otherwise caused by, for instance, motion vectors pointing to far away so as to leave the co-located tile of the reference picture and/or otherwise caused by deriving motion information prediction from a reference picture from regions beyond the boundaries of the tile to which block 104 belongs.

Before attending to the description of embodiments of the present application, however, specific coding tools are described as examples, which might be implemented in a block-based video encoder and block-based video decoder in accordance with an embodiment of the present application, and which are liable to provoke tile-interdependencies between different tiles of different pictures and thus, are liable to cause a conflict with the constraint illustrated in FIG. 4 by use of the interrupted arrow 110.

Typical state of the art video coding makes heavy use of inter-prediction between frames in order to increase coding efficiency. For inter-prediction constrained encoding, the inter-prediction process typically needs to be adapted to obey spatial segment boundaries, which is achieved through encoding bitrate-wise significant motion information prediction residuals or MV differences (with respect to the available motion information predictors or MV predictors).

Typical state of the art video coding heavily relies on the concept of gathering motion vector predictors in so-called candidate lists at different stages of the coding process, e.g. the merge candidate list, that also includes mixed variants of MV predictors.

A typical candidate added to such lists is the MV of the co-located block from temporal motion vector prediction (TMVP), which is the bottom-right block next to the same spatial position than the current coded block but in a reference frame for most current blocks. The only exception is the blocks at the picture boundary and blocks at the bottom boundary of a CTU row (at least in HEVC) where the actual co-located block is used to derive the so-called center co-located candidate as no right-bottom block is within the picture.

There are use cases in which using such candidates might be problematic. For instance, when tiles are used and partial decoding of tiles is performed, their availability might change. This happens because the TMVP used at encoder could belong to another tile that is not being currently decoded. The process also affects all candidates after the index of the co-located candidate. Therefore, decoding such a bitstream can lead to encoder/decoder mismatches.

Video coding standards such as AVC or HEVC rely on high-precision motion vectors with a higher accuracy than integer pixels. This means that motion vectors can reference samples of previous pictures that do not lay at integer sample positions but at subsample positions. Therefore, video coding standards define an interpolation process to derive the value of sub-sample sampling positions by means of an interpolation filter. In case of HEVC, for instance, an 8-tap interpolation filter has been used for the luma component (and a 4-tap for chroma).

As a result of the sup-pel interpolation processes employed in many video coding specifications, it may happen that when using a motion vector MV2 pointing to an non-integer sample position, with a length (horizontal or vertical component) smaller than that of a motion vector MV1 pointing to a integer sample position in the same direction, samples reaching further away from the origin (e.g. such of a neighboring tile) are used due to the sub-sample interpolation process, while using the MV1 motion vector would not require samples of the neighboring tile.

Figure 5:
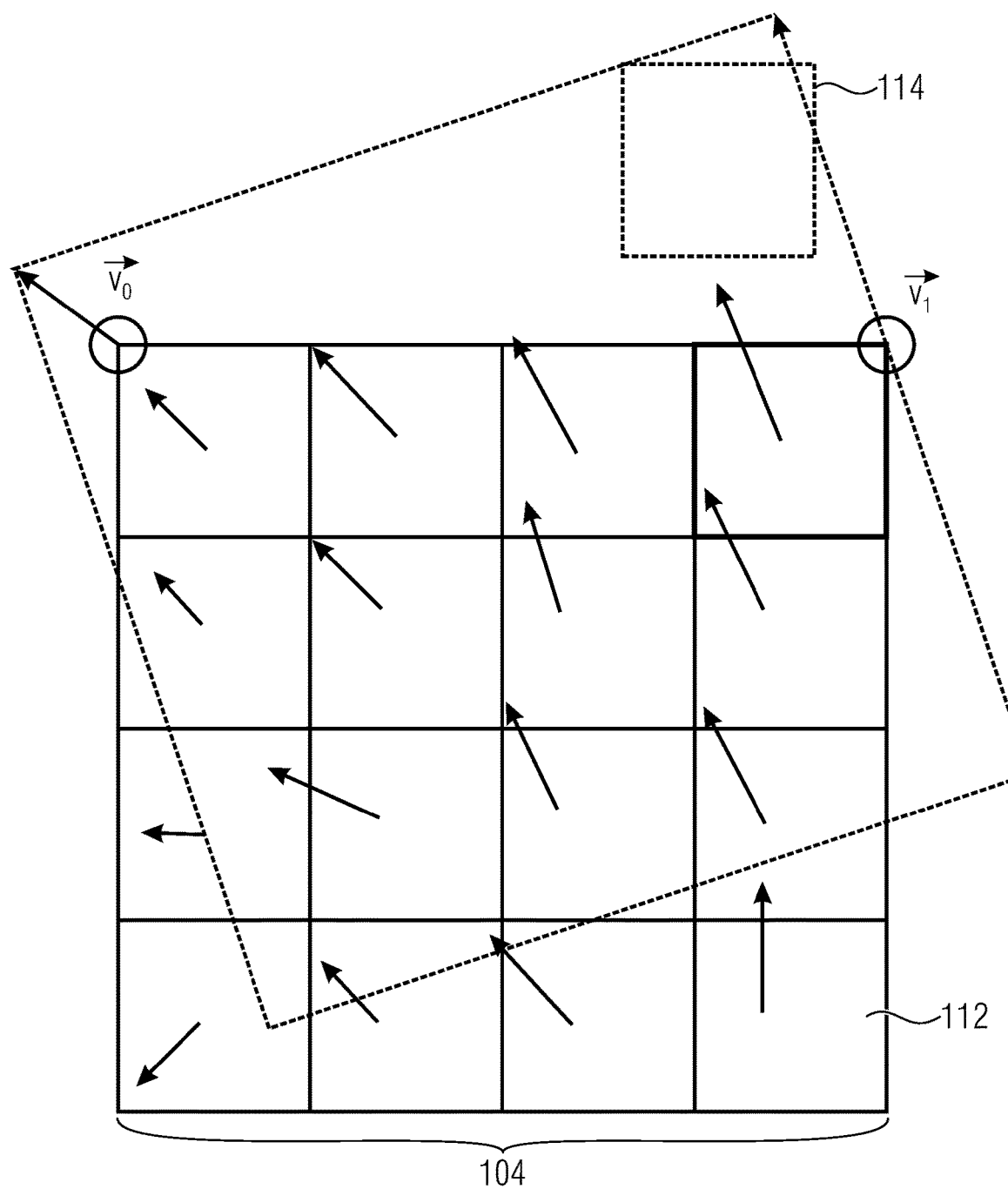
FIG. 5 shows a schematic diagram illustrating the JEM (joint exploration codec mode) affine motion model.

Traditionally, video coding employs a translation-only motion model, i.e. rectangular blocks are displaced according to a two-dimensional motion vector to form a motion-compensated predictor for the current block. Such a model cannot express rotational or zooming motion that is common in many video sequences and hence, there have been efforts to slightly extent the traditional translational motion model, e.g. as referred to as affine motion in JEM. As illustrated in FIG. 5, in this affine motion model, two (or three) so called control point motion vectors per block 104 ($v_0$, $v_1$) are used to model rotational and zooming motion. The control point motion vectors $v_0$, $v_1$ are chosen from MV candidates of the adjacent blocks. The resulting motion compensated predictor is derived via computing a sub-block based motion vector field and rely on traditional translational motion compensation of rectangular sub-blocks 112. FIG. 1 exemplarily illustrates the resulting predictor or patch 114 (dashed line) from which the top-right sub-block (solid lines) is predicted according to the respective sub-block motion vector.

Figure 6:
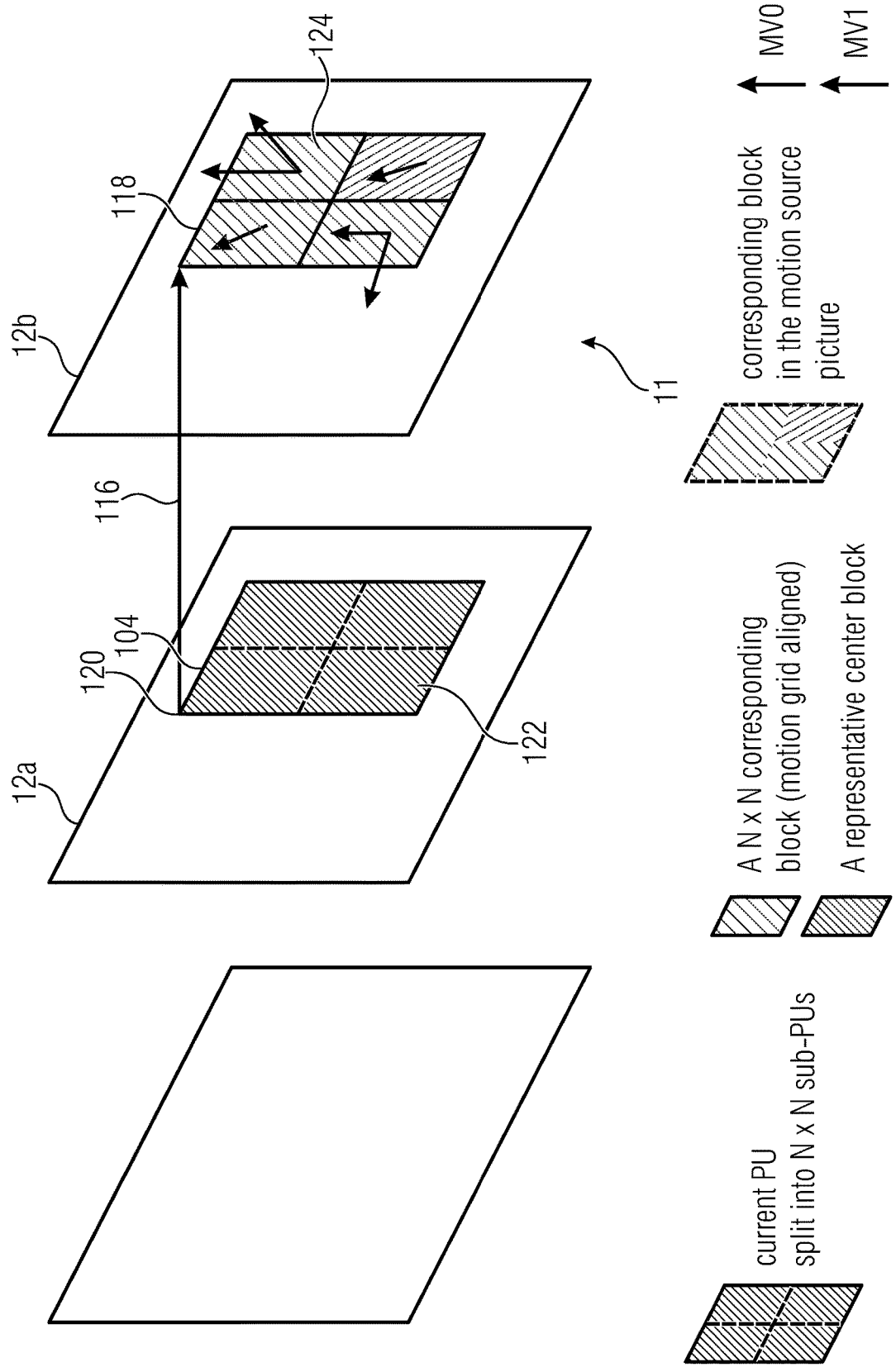
FIG. 6 shows a schematic diagram illustrating the ATMVP (Alternative Temporal Motion Vector Prediction) procedure.

Motion Vector Prediction is a technique to derive motion information from temporal or spatial-temporal correlated blocks. In one such procedure referred to as Alternative TMVP (ATMVP) as illustrated in FIG. 6, a default MV candidate (e.g. first merge candidate in the merge candidate list) from the list of a block 104 in the current picture 12a referred to as temporal vector 116, is used to determine the correlated block 118 in a reference frame 12b.

In other words, for the current prediction block 104 within a CTU, a co-located prediction block 118 is determined in the reference picture 12b. To locate the co-located block 118, a motion vector MVTemp 116 is selected from spatial candidate within the current picture 12a. The co-located block is determined by adding the motion vector MVTemp 116 to the current prediction block location 12a.

For each sub-block 122 of the current block 104, motion information of the respective sub-block 124 of the correlated block 118 is then used for inter-prediction of the current sub-block 122, which also incorporates additional procedures such as MV scaling for the temporal difference between the involved frames.

Figure 7:
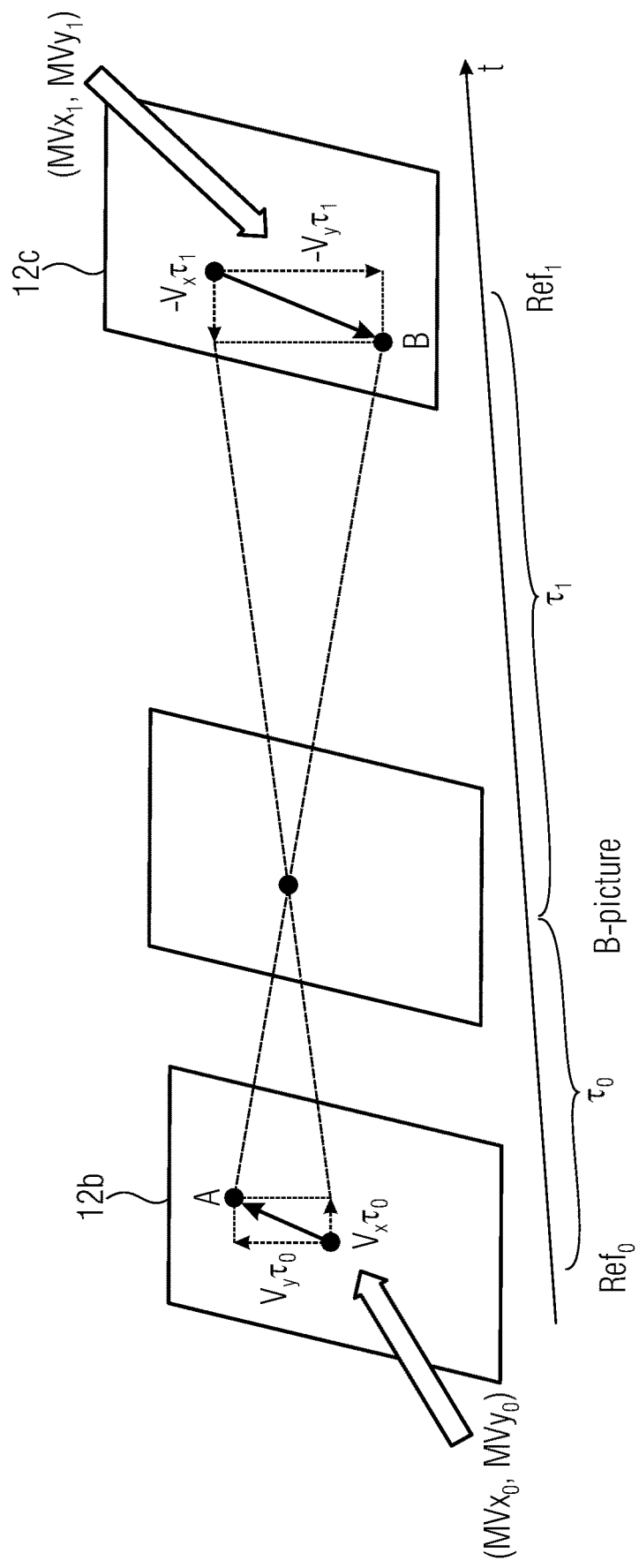
FIG. 7 shows a schematic diagram illustrating the Optical Flow trajectory used in the BIO (Bi-directional Optical Flow) tool.

Bi-directional Optical Flow (BIO) uses a sample-wise motion refinement that is performed on top of block-wise motion compensation for bi-prediction. FIG. 7 illustrates the procedure. Refinement is based on minimizing the difference between image patches (A,B) in two reference frames 12b, 12c (Ref$_0$, Ref$_1$) based on the optical flow theorem which in turn is based on the horizontal and vertical gradients of the respective image patches. Gradient images, i.e. measures of the directional changes in the luma intensity in an image, in horizontal and vertical direction of each of the image patches in A and B are calculated to derive a per-sample enhancement offset for the prediction block.

A new concept is introduced in current state-of-the-art video codecs, such as the test model of VVC, referred to as History-based Motion Vector prediction (HMVP), in which a duplicate-free FiFo buffer of the last used MVs is maintained to fill up MV candidate lists with more promising candidates than zero motion vectors. State-of-the-art codecs add the HMVP candidates to a motion vector candidate list after the (sub-block or block-wise) co-located or spatial candidates.

After having described the general functionality of a block-based video encoder and decoder in accordance with an example set out above with respect to FIGS. 1 to 3, and having generally explained the aim of tile-independent coding as well as some coding tools the usage of which, individually, is liable to contract the tile-independent coding as not specifically taken into account, or are liable to become very ineffective if taken into account in a disadvantageous manner. In the following, embodiments are described which enable the obeyance of the tile independence with nevertheless quite effectively using coding tools such as those exemplarily set out above.

Figure 8:
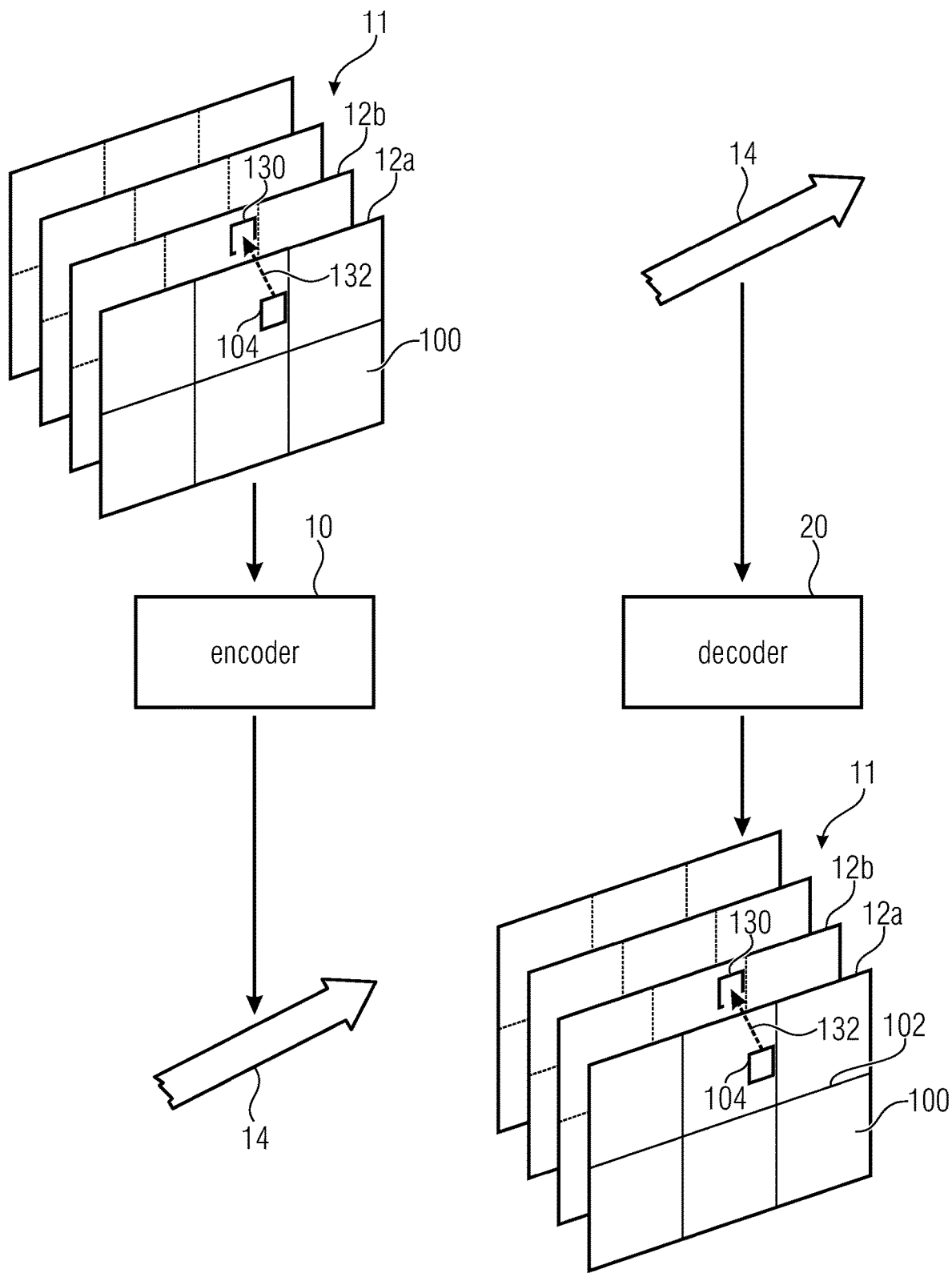
FIG. 8 shows a schematic diagram illustrating the tile-awareness or tile-aware motion information derivation with respect to a predetermined inter-predicted block by the decoder according to some embodiments of the present application and the encoder's utilization of that decoder's behavior for sake of a more effective tile independence codec.

FIG. 8 shows a block-based video encoder 10 and a block-based video decoder 20 in the accordance with the embodiment of the present application, wherein, as already stated above, the re-usage of the reference signs of FIGS. 1 and 2 shall not mean that the encoder 10 and the decoder 20 of FIG. 8 would have to be construed as outlined above with respect to FIGS. 1 and 2, although they may be, or may partially be. The encoder 10 encodes the video 11 into data stream 14 while the decoder 20 decodes from data stream 14 a reconstruction of video 11. The pictures 12 of video 11 are partitioned into tiles 100 as explained with respect to FIG. 4. The coding independence among tiles 100 is a task which, according to FIG. 8, is not only taken into account by the encoder 10 in encoding video 11 into data stream 14. Rather, the decoder 20 is also aware of the tile boundaries 102 which lead through the inner of the pictures 12 of video 11 and separate neighboring tiles 100 from each other. In particular, as already outlined above with respect to FIG. 4, the tiles 100 also extend in the dimension of time as each picture 12 is, in the same manner, partitioned into tiles 100 so that each tile of one picture has a co-located tile in any other picture of video 11. Thus, motion information used for predicting inter-predicted blocks within one picture 12 should remain within the current tile, i.e. in the same tile of the respective inter-predicted block. In other words, the motion information for such an inter-predicted block of a current picture, which locates a patch in a reference picture, from which the respective inter-predicted block is to be predicted, should not cause inter-tile dependency. In accordance with FIG. 8, the decoder alleviates, at least to some extent, the situation for the encoder 10 and derives motion information for a predetermined inter-predicted block 104 of a current picture 12a of video 11, which locates a patch 130 in a reference picture 12b of the video, from which the predetermined inter-predicted block 104 is to be predicted, from the data stream 14 in a manner depending on a position of the boundaries 102 within the pictures 12 of video 11. The motion information, thus derived, may, for instance, be defined, or comprise, a motion vector 132. The encoder 10, in turn, may rely on this decoder behavior and may act as follows: still, the encoder 10 determines the motion information 132 for the predetermined inter-predicted block of the current picture 12a in a manner so that the patch 130 remains within, and does not cross, boundaries 102 of the tile within which this inter-predicted block 104 is located. To be more precise, the encoder 10 determines the motion information 132 such that the patch is within the boundary of the co-located tile of reference picture 12b, i.e. the tile co-located to the tile within which block 104 is located. The encoder 10 determines this motion information 132 in this manner and uses this motion information for inter-prediction of block 104. In encoding the motion information into the data stream 14, however, the encoder makes use of the decoder's 40 functionality or, to be more precise, the awareness of decoder 20 with respect to boundaries 102. Accordingly, the encoder 10 encodes the motion information 132 into the data stream 14 so that a derivation thereof from the data stream 14 is to be performed depending on, i.e. entails a dependency on, a position of the boundaries 102 between tiles 100.

In accordance with the embodiments described next, the decoder 20 uses the aforementioned tile boundary awareness, i.e. the dependency of the derivation of the motion information from the data stream on the boundary positions of the tiles, in order to enforce the tile independency with respect to the signal state of the motion information for the predetermined inter-predicted block 104. See FIG. 9. The data stream 14 comprises a portion or syntax portion 140 which signals the motion information for block 104. This portion 140, thus, determines the signaled state of the motion information for block 104. Later on, it will be described that portion 140 may, for instance, comprise a motion vector difference, i.e. a motion vector prediction residual, and, optionally, a motion predictor index pointing into a list of motion predictors. A reference picture index identifying the reference picture 12b to which the motion vector relates may also, optionally, comprised by portion 140. Whatever description for the motion information portion 140 is exactly used, as long as a signaled state of the motion information for block 140 leads to the corresponding patch 130 from which block 104 would then be predicted, is within the same tile 100a to which block 104 belongs, this signaled state would not be in conflict with the tile-independency constraint and, accordingly, decoder 20 may leave this state as it is and use this state as final state for the motion information, i.e. as the state used for the inter-prediction of block 104 from patch 130. Two exemplary signaled states are indicated in FIG. 9: the state indicated by an encircled 1 is associated with motion information 132a leading to patch 130a which is clearly within tile 100a. The other state indicated by an encircled 2 has associated therewith motion information 132b and leads to patch 130b crossing boundary 102 from current tile 100a to a neighboring tile 100b. The overlapping portion of patch 130b, overlapping with a neighboring tile 100b, is indicated by hatching in FIG. 9. Predicting block 104 from patch 130b would introduce inter-tile-dependency as samples of the neighboring tile 100b would be used to predict block 104. Accordingly, the decoder 20 would, in accordance with the example of FIG. 9, check whether the signaled state of portion 140 is such a state like state 2 of FIG. 9 where the patch is, at least partially, outside tile 100a, and if so, redirect the motion information from the signaled state to a redirected state leading to the patch 130 to remain within the boundaries 102 of current tile 100a. Dash-dotted lines in FIG. 9 indicate such patch 130'b located by a redirected state 2' of redirected motion information 130b'.

There are different manners at which such redirection may be performed. Details are set out herein below. In particular, as the following description will reveal, it might be that the patches 130a, 130b and 130'b may be of different sizes. At least some of them might be of different size compared to block 104. This might be caused, for instance, by the necessity to use an interpolation filter for predicting block 104 from the reference picture at the respective patch in case of, for instance, the corresponding motion information involving a sub-pel motion vector. As became clear from the description of FIG. 9, the redirection 142 just described results in the encoder having two choices to signal motion information 130b' inside data stream 14: the encoder may use signal state 2 or the state 2'. This "freedom" may lead to a lower bitrate. Imagine, for instance, predictive coding being used in order to signal the motion information. If a predictor for the motion information for block 104 indicated state 2, the encoder would be enabled to simply use this predictor and signal motion information prediction residual of zero in portion 140 of data stream 14, thereby signaling state 2, which would be redirected by the decoder to state 2'.

FIG. 10 illustrates the possibility already mentioned with respect to FIG. 9: the decoder may use the dependency of the motion information derivation from the data stream on the tile boundary positions in order to obey, or enforce, the constraints on tile independency with respect to the signaled state of the motion information which, in turn, is the result of a prediction of the motion information and a correction thereof using a motion information prediction residual signal in portion 140 of data stream 14 for block 104. That is, for block 104, encoder and decoder would provide a motion information prediction or motion information predictor 150 such as a vector, by use of previously coded blocks such as based on motion information used for coding/decoding spatially neighboring blocks of block 104 in the current picture or blocks located near block 104 in a certain reference picture. The latter may be the reference picture 12b containing the patch 130 or another picture used for motion information prediction. A motion information prediction residual 152 such as a motion vector difference is signaled in portion 140 for block 104. The decoder, thus, decodes the motion information prediction residual 152 from data stream 14 and determines the motion information (such as a motion vector) to be used for block 104 based on the motion information prediction 150 and the motion information prediction residual 152. For instance, in case of motion vectors, the sum of motion vectors 150 and 152 indicates the signaled motion vector 154, quasi the signal state of the motion information for block 104, which points to the footprint or patch 130 from which block 104 is to be predicted by placing the foot of motion vector 154 to a predetermined position 156 such as, for instance, the position in the reference picture co-located to a predetermined alignment location, such as a corner, of block 104 such as the upper left corner 158 as depicted in FIG. 10. The head of vector 154 would then point, for instance, to the upper left corner of the footprint of block 104. Patch 130 could be, as outlined before, enlarged or otherwise deformed compared to the pure footprint owing to filtering or other techniques such as interpolation filtering used to derive the prediction for block 104 from patch 130. In accordance with the embodiments described next, it is this predictively decoded motion information 154 which is subject to the constraint obeyance/enforcement.

That is, the decoder would obey or enforce a constraint on the motion information 154 so that the patch 130 does not exceed boundaries 102 of a tile 108 to which block 104 belongs. As explained with respect to FIG. 9, the decoder uses for this obeyance/enforcement a non-invertible mapping. The mapping maps possible signaled states, here in FIG. 10 possible combinations of motion information prediction 150 and motion information prediction residual 152, onto non-conflicting states for the motion information 154. The non-invertible mapping maps each possible combination onto a final motion information so that the patch 130 placed according to such final motion information remains within the boundaries 102 of the current tile 100a. As a consequence, depending on the position 104 with respect to the tile boundaries of the current tile and/or the direction and size of motion information prediction 150, there are combinations of motion information prediction 150 and motion information prediction residual 152, i.e. possible signaled states, which are mapped onto the same final motion information 154, i.e. the same final state, although these different combinations share, for instance, the same motion information prediction 150 and inly differ in residual 152. As a consequence, the encoder has the freedom to select the motion information prediction residual 152. FIG. 10, for instance, illustrates that a motion information prediction residual 152' might lead, owing to the constraint obeyance/enforcement on the decoder-side, to effectively the same motion information 154, namely owing to the redirection 142 of the just mentioned non-invertible mapping, respectively.

In such cases, where the encoder has the freedom to select any motion information prediction residual among ones leading, effectively, to the same motion information to be applied for block 104 for performing the inter-prediction, the encoder 10 may use the one being zero as this setting is likely to be the one leading to the lowest bitrate.

Figure 11:
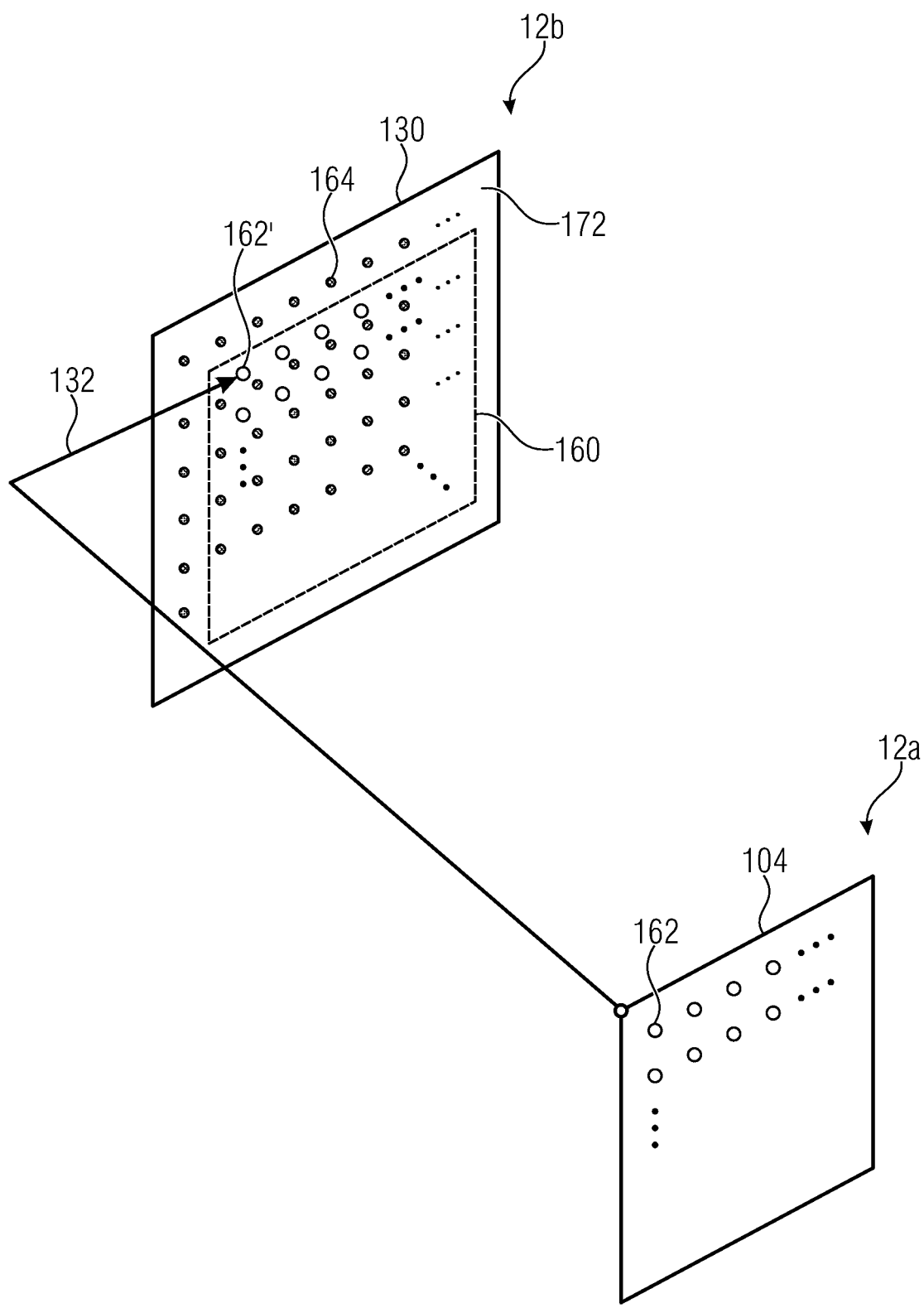
FIG. 11 shows a schematic diagram illustrating the possibility of patch size variations and/or patch size enlargements due to mathematical sample combinations to compute individual samples of the inter-predicted block.

FIG. 11 illustrates what has also already been mentioned above, namely the possibility that the patch 130 from which block 104 is to be inter-predicted, with the patch 130 being positioned according to certain motion information such as a certain motion vector 132, may be of a different shape than compared to block 104. Usually, patch 130 will be larger than the mere footprint 160 of block 104 within the reference picture, displaced relative to its position in the current picture according to the motion information 132. In particular, in performing the actual prediction of block 104 from patch 130, decoder and encoder may predict each sample 162 of block 104 by means of a mathematical combination of samples 164 within a respective portion of patch 160. Normally, the portion of the patch 130 contributing to the mathematical combination for a certain block sample 162 is positioned at and around the position of the respective sample 162, displaced according to motion information 132, i.e. at or around its displaced sample position 162' within the reference picture 12b. For instance, the mathematical combination may be a weighted sum of samples of the portion corresponding to a respective sample out of block 104. This portion for each sample 162 may, for instance, be determined by the kernel of an interpolation filter in case of the motion vector 132 being a sub-pel motion vector and, thus, determining a sub-pel displacement of block 104 to sub-pel sample positions within the reference picture 12b. Interestingly, no interpolation filter may, for instance, be necessary in case of the motion information 132 comprising a full-pel motion vector so that patch 130 would, in that case, be as large as block 104 and each sample 162 would be predicted by setting it equal to one corresponding sample 164 in the patch 130. Another sort or origin or contribution to the enlargement of the footprint 160 to the patch 130 may alternatively or additional stem from other inter-prediction tools such as the BIO tool referred to in the following more specifically. In particular, according to BIO it might be that the predictor derived from patch 130 is only one two hypotheses of block 104 which would be bi-predictively predicted in that case. To gain this predictor, however, a preliminary version of the predictor derived with interpolation in case of a sub-pel motion vector and without interpolation filter in case of a full-pel motion vector would be determined in a manner at which this preliminary version is enlarged relative to the actual block's 104 size by n samples in all directions (n>0 such as 1). This is done to determine a local luminance gradient over several positions distributed over the block's 104 area of this preliminary predictor and combine both hypotheses, i.e. the preliminary predictor gained from the reference picture 12b and another preliminary predictor gained likewise from another reference picture, within the block's area by way of a linear combination in a manner varying over the block's area depending on the local gradient to obtain the final bi-predictive predictor. With respect FIG. 22 it is explained that the latter BIO contribution onto the patch enlargement may be disregarded and that the BIO tool may be deactivated instead depending on whether the n-sample wide BIO extension contribution (n>0) of the patch enlargement would otherwise lead to the patch 130 crossing boundary 102. That is, the present re-direction procedure would be preliminarily preformed with disregarding the BIO tool and the BIO tool would be in a boundary aware manner be deactivated by encoder and encoder instead. Further, another mode which might be used besides the BIO tool, is the affine motion model tool according to which the motion information contains two motion vectors for the current block 104 which define motion vectors of a motion vector field within block 104 at two different corners of the block 104 and based on which using an affine motion model subblock motion vectors for subblocks of block 104 are computed. The resulting subblock's patches may be thought of forming a composed patch as depicted, for instance, in FIG. 20, composed of the subblock's patches, and again, the tile independency enforcement may enforce that the composed patch as a whole, i.e. none of the individual subblock's patches, does not cross the boundary 102. Relating to the redirection and enforcement procedure explained with respect to FIGS. 9 and 10, respectively, the above explained functionality means that the varying patch size of patch 130 is taken into account with respect to both, the size of the patch for an actually signaled motion information to be subject to conditional redirection as well as with respect to the motion information settings onto which any "problematic" motion information is redirected or re-mapped thereon. That is, although not explicitly mentioned with respect to FIG. 9, redirection of a certain motion information state may lead to a variation of the patch size: the not yet redirected state such as state 2 in FIG. 9, may have a different patch size than the one, namely 2', to which the redirection 142 leads.

Figure 12A:
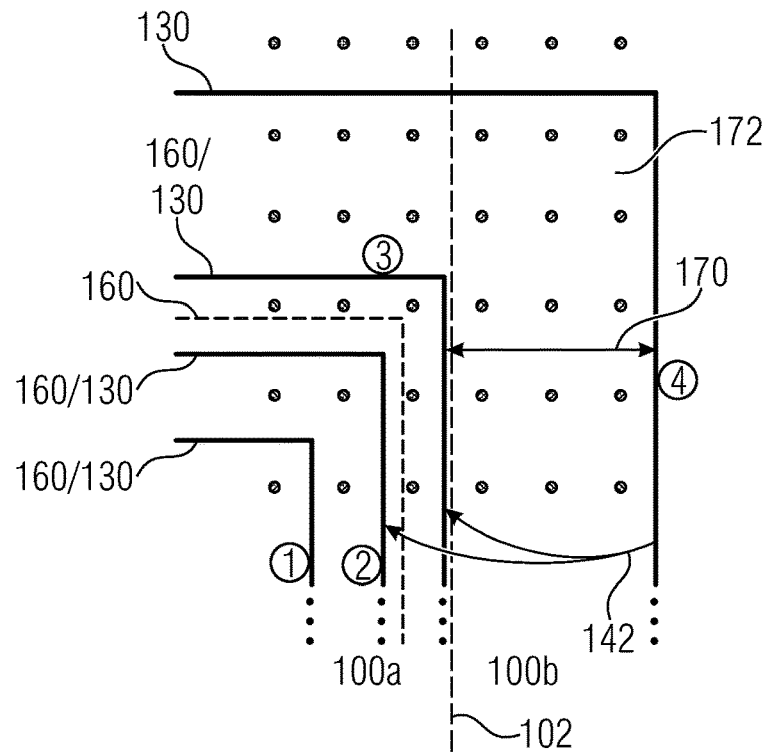
FIGS. 12a and b show schematic diagrams illustrating different possibilities for realizing the motion redirection or the non-invertible mapping in connection with motion accuracy dependent patch size due to motion accuracy dependent activation of an interpolation filter, with aiming at allowing patches to get as close as possible to the current tile's boundary in case of FIG. 12 and with realizing a safety margin for the motion vectors in case of FIG. 12b.

Different possibilities exist as to how the aforementioned non-invertible mapping or redirection is performed. This is true with respect to both sides, the states subject to redirection in forming the input of the non-invertible mapping, on the one hand, and the redirected states of the output of the non-invertible mapping on the other hand. FIG. 12a shows one possibility. FIG. 12a shows, or illustrates, four different settings 1, 2, 3 and 4, not yet having been redirected or subject to the non-invertible mapping by showing the corresponding patches relative to the boundary 102 separating the current tile 100a on the one hand and a neighboring tile 100b on the other hand. For the first three states 1, 2 and 3, the patch 130 is smaller than in case of state 4. In particular, FIG. 12a illustrates that in states 1, 2 and 3, the patches 130 coincide with the footprint 160 of the inter-predicted block. In state 4, patch 130 is enlarged relative to the footprint 160 which is illustrated in FIG. 12a by dashed lines for this setting 4. The enlargement is, for instance, owing to the corresponding motion vector in state 4 being a sub-pel motion vector, while being a full-pel motion vector in states 1 to 3. Owing to this enlargement, although the patches 130 for states 1 to 3 lie within the current patch 100a and do not cross boundary 102, patch 130 in case of state 4 extends beyond boundary 102 although its corresponding motion vector lies between the full-pel motion vectors of states 2 and 3.

Figure 12B:
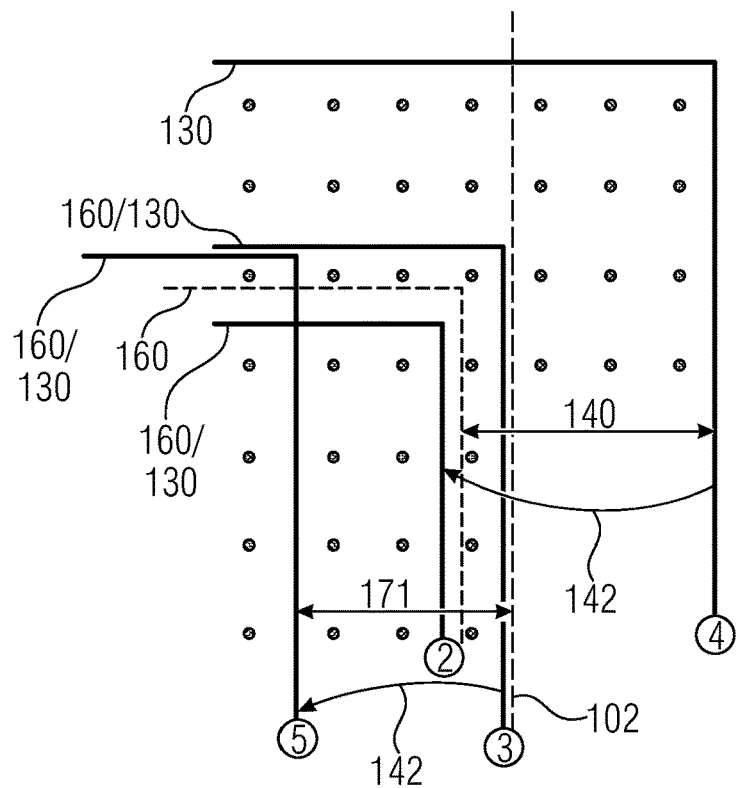

That is, in any case, the constraint obeyance/enforcement will have to redirect state 4. In accordance with some embodiments, described later on, states 1, 2 and 3 are left as they are as the corresponding patches do not cross boundary 102. This means, in effect, that the co-domain of the non-invertible mapping, i.e. the reservoir or domain of redirected states, allows for patches 130 to get closer to the boundaries 102 of the current tile 100a than a width 170 of an extension edge portion 172 by which the patch 130 is widened compared to footprint 160 of the inter-predicted block 104, respectively. In other words, full-pel motion vectors leading to patches 130 which do not cross boundary 102 are left unchanged, for instance, in the redirection process 142. In different embodiments, even those states of the motion information are redirected, the associated patches of which do not extend beyond the boundary 102 into a neighboring tile, but which are not extended relative to the footprint and if they would they would cross the boundary 102: in the example of FIG. 12a, these are states 1, 2 and 3, and even those would be redirected in order to be distanced from boundary 102 in a manner so as to, at least, accommodate width 170. See FIG. 12b, where state's 3 patch 130 is shown to have a distance from boundary 102 which is smaller than extension reach 170. It is, thus, re-directed to a full-pel state 5 the associated patch 130 or footprint 160 of which has a distance 171 at least as large as extension reach 171. That is, state 3 is redirected here to a state 5 where the corresponding patch 130 does not comprise the boundary area 172 and nevertheless is distanced from boundary 102 by a distance 171 at least as large as width 170.

In other words, as a result of the sub-pel interpolation processes employed in many video coding specifications, samples multiple integer sampling positions away from the nearest full-pel reference block position may be used. Let's assume that a motion vector MV1 would be a full-pel motion vector while MV2 would be a sub-pel motion vector. More concrete, assuming a block 104 of size $B_W \times B_H$ at a position $Pos_x$, $Pos_y$ lying in tile 100a. Focusing on the horizontal component, in order to avoid using samples of a neighboring tile 100b or the tile to the right, the MV1 could be at most so large that (assuming $MV1_x > 0$) $Pos_x + B_W - 1 + MV1_x$ is equal to the rightmost sample of the tile 100a that the block 104 belongs to or (assuming $MV1_x < 0$, i.e. the vector points to the left) $Pos_x + MV1_x$ is equal to the leftmost sample of the tile 100a that the block belongs to. However, for MV2, we have to incorporate the interpolation overhead from the filter kernel size to avoid reaching into a neighbor tile. For instance, if we consider $MV2_x$ as its integer part of MV2, MV2 could only be at most so large that (assuming $MV2_x > 0$) $Pos_x + B_W - 1 + MV2_x$ is equal to the rightmost sample—4 of the tile that the block belongs to, and (assuming $MV2_x < 0$) $Pos_x + MV2_x$ is equal to the leftmost sample +3 of the tile that the block belongs to.

The "3" and "−4" are here examples for width 170 caused by an interpolation filter. Other kernel sizes may, however, apply as well.

However, it is desirable to establish means to be able to restrict motion compensated prediction on tile boundaries in an efficient manner. A number of solutions to the issue is described in the following.

One possibility is to clip motion vectors with respect to the boundaries 102 of the independent spatial regions, i.e. tiles 100, within the coded picture. Furthermore, they may be clipped in a manner adaptive to the motion vector resolution.

Given a block 104:
With size equal to $B_W \times B_H$
With a position equal to $Pos_x$, $Pos_y$
Belonging to a tile 100a with boundaries 102 defined by $Tile_{Left}$, $Tile_{Top}$, $Tile_{Right}$ and $Tile_{Bottom}$
Lets define:
$MVX_{Int}$ as MVX>>precision
$MVY_{Int}$ as MVY>>precision
$MVX_{Frac}$ as $MVX\&(2^{precision}-1)$
$MVY_{Frac}$ as $MVY\&(2^{precision}-1)$
with MVX being the horizontal component of the motion vector, MVY being the vertical component of the motion vector and precision indicating the accuracy of motion vectors. For instance, in HEVC the accuracy of MVs is $\frac{1}{4}^{th}$ of samples and therefore precision=2.

We clip the full-pel part of motion vector MV so that, when setting zero the sub-pel part, the resulting clipped full-pel vector results in a footprint or patch lying strictly within tile 100a:
$MVX_{Int}$=Clip3($Tile_{Left}$-$Pos_x$, $Tile_{Right}$-$POS_x$-($B_W$-1), $MVX_{Int}$)
$MVY_{Int}$=Clip3($Tile_{Top}$-$Pos_y$, $Tile_{Bottom}$-$Pos_y$-($B_H$-1), $MVY_{Int}$)
When $MVX_{Int}$<=$Tile_{Left}$-$Pos_x$+3 or $MVX_{Int}$>=$Tile_{Right}$-$POS_x$-($B_W$-1)-4 (assuming the 8 tap filter in HEVC), meaning that, horizontally, the full-pel part of the motion vector (after clipping) is nearer to boundary 102 then extension reach 170,
$MVX_{Frac}$ is set to 0
When $MVY_{Int}$<=$Tile_{Top}$-$Pos_y$+3 or $MVY_{Int}$>=$Tile_{Bottom}$-$Pos_y$-($B_H$-1)-4 (assuming the 8 tap filter in HEVC), meaning that, horizontally, the full-pel part of the motion vector (after clipping) is nearer to boundary 102 then extension reach 170,
$MVY_{Frac}$ is set to 0

This corresponds to the situation described with respect to FIG. 12a where the full-pel motion vectors of states 1, 2 and 3 are allowed to remain as they are since the corresponding patches do not extend into the neighboring tile 100b. Any full-pel motion vector leading to a patch 130 extending beyond boundary 102, would be clipped to the nearest full-pel motion vector the corresponding patch of which is still within boundary 102 without crossing it. For sub-pel motion vectors the enlarged patch 130 of which crosses boundary 102, the following procedure is applied: the sub-pel motion vector is mapped onto the nearest full-pel motion vector the patch of which stays within tile 100a, but which is smaller than the sub-pel motion vector. That is, the full-pel part of the motion vector is clipped accordingly, and the sub-pel part is set to zero. This means that if the sub-pel motion vector's full-pel part, i.e. the down-rounded version of the sub-pel motion vector, does not lead to footprint 160 leaving tile 100a, then the sub-pel part of the sub-pel motion vector is simply set to zero. State 4 is, accordingly, redirected to state 2.

Alternatively to setting the fractional components to zero, the integer pel part of the motion vector might not be floored to the next smaller integer pel position as specified above but could also be rounded to the spatially closest neighboring integer pel position as in the following:

We clip the full-pel part of motion vector MV so that, when setting zero the sub-pel part, the resulting clipped full-pel vector results in a footprint or patch lying strictly within tile 100a as we did before.
$MVX_{Int}$=Clip3($Tile_{Left}$-$Pos_x$, $Tile_{Right}$-$Pos_x$-($B_W$-1), $MVX_{Int}$)
$MVY_{Int}$=Clip3(Tile Top-$Pos_y$, $Tile_{Bottom}$-$POS_y$-($B_H$-1), $MVY_{Int}$)
When $MVX_{Int}$<=$Tile_{Left}$-$Pos_x$+3 or $Tile_{Right}$-$Pos_x$-($B_W$-1)>$MVX_{Int}$>=$Tile_{Right}$-$POS_x$-($B_W$-1)-4 (assuming the 8 tap filter in HEVC)
$MVX_{Int}$=$MVX_{Int}$+($MVX_{Frac}$+(1<<(precision-1))>>precision)
When $MVX_{Int}$<=$Tile_{Left}$-$Pos_x$+3 or $MVX_{Int}$>=$Tile_{Right}$-$Pos_x$-($B_W$-1)-4 (assuming the 8 tap filter in HEVC)
$MVX_{Frac}$ is set to 0
When $MVY_{Int}$<=$Tile_{Top}$-$Pos_y$+3 or $Tile_{Bottom}$-$POS_y$-($B_H$-1)>$MVY_{Int}$>=$Tile_{Bottom}$-$POS_y$-($B_H$-1)-4 (assuming the 8 tap filter in HEVC)
$MVY_{Int}$=$MVY_{Int}$+($MVY_{Frac}$+(1<<(precision-1))>>precision)
When $MVY_{Int}$<=$Tile_{Top}$-$Pos_y$+3 or $MVY_{Int}$>=$Tile_{Bottom}$-$POS_y$-($B_H$-1)-4 (assuming the 8 tap filter in HEVC)
$MVY_{Frac}$ is set to 0

That is, the procedure discussed previously would be varied as follows: the motion vector is rounded to the nearest full-pel motion vector not leaving tile 100a. That is, the full-pel part may be clipped, if necessary. If the motion vector was a sub-pel motion vector, however, the sub-pel part is not simply set to zero. Rather, a rounding to the nearest full-pel motion vector is performed, i.e. to the full-pel motion vector nearest to the motion vector differing from the initial sub-pel motion vector by having conditionally clipped the full-pel part. This would lead, for instance, to mapping state 4 of FIG. 12*a*, or redirecting same, to state 3 instead of state 2.

In even other words, in accordance with the first alternative discussed just before, motion vectors that patch 130 of which extend between boundary 102, are redirected to a full-pel motion vector by clipping the full-pel part of the motion vector so that the footprint 160 remains within tile 100*a*, where, then, the sub-pel is set to zero. As a second alternative, after full-pel part clipping, a rounding to the nearest full-pel motion vector is performed.

Another option would be to be more restrictive and clip the integer and fractional part of a motion vector all together in such a way as to guarantee that eventually occurring subsample interpolation incorporating samples of another tile is avoided. This possibility FIG. 12*b* referred to.

$MVX = Clip3((Tile_{Left} - Pos_x + 3) << precision, (Tile_{Right} - Pos_x - B_W - 1 - 4) << precision, MVX)$ $MVY = Clip3((Tile_{Top} - Pos_y + 3) << precision, (Tile_{Bottom} - Pos_y - B_H - 1 - 4) << precision, MVY)$ As the above description revealed, MV clipping is dependent on the block size to which the MV applies.

The description neglected the juxtaposition of color components the spatial resolution of which might differ. Thus, the clipping procedures shown above do not consider the chroma formats, or just the mode 4:4:4 in which there is a chroma sample for each luma sample. However, there are two additional chroma formats with a different relationship between chroma and luma samples:
- 4:2:0, with chroma having half of the luma samples in horizontal and vertical direction (i.e. one chroma sample for every two luma in each direction)
- 4:2:2, with chroma having half of the samples in horizontal direction but same samples in vertical direction (i.e. one chroma sample per luma sample in the vertical direction but one chroma samples per two luma in horizontal direction)

The chroma sup-pel interpolation process may use a 4-tap filter while the luminance filter uses an 8-tap filter as discussed above. As mentioned above the exact numbers do not matter. The chrome interpolation filter kernel size may be half of that for luma, but even this may be varied in alternative embodiments.

For the 4:2:0 case the derivation of the integer and fractional part of the motion vector is as follows:

$MVX_{Int}$ as $MVCX >> (precision+1)$
$MVY_{Int}$ as $MVCY >> (precision+1)$
$MVX_{Frac}$ as $MVCX \& (2_{precision+1} - 1)$
$MVY_{Frac}$ as $MVCY \& (2^{precision+1} - 1)$ This means that the integer part is the half of the corresponding luma part and the fractional part has a more fine granular signaling. E.g. in HEVC where precision=2 in case of luma there are 4 sub-pel that can be interpolated between samples, while for chroma there are 8.

This leads to the fact that when $xPos + MVX_{Int} = Tile_{Left} + 1$ with $MVX_{Int}$ defined as for luma (not chroma as above) for a 4:2:0 format, it lands in a integer luma sample but in a fractional chroma sample. Such a sample would through the sup-pel interpolation use one chroma sample beyond $Tile_{Left}$, which would prevent tile independency. The cases where such an issue occurs is:

4:2:0 (ChromaType=1 in HEVC)
$xPos + MVX_{Int} = Tile_{Left} + 1$ with $MVX_{Int}$ defined as for luma
$xPos + (B_W - 1) + MVX_{Int} = Tile_{Right} - 2$ with $MVX_{Int}$ defined as for luma
$yPos + MVY_{Int} = Tile_{Top} + 1$ with $MVY_{Int}$ defined as for luma
$yPos + (B_H - 1) + MVY_{Int} = Tile_{Bottom} - 2$ with $MVY_{Int}$ defined as for luma 4:2:2 (ChromaType=2 in HEVC)
$xPos + MVX_{Int} = Tile_{Left} + 1$ with $MVX_{Int}$ defined as for luma
$xPos + (B_W - 1) + MVX_{Int} = Tile_{Right} - 2$ with $MVX_{Int}$ defined as for luma There are two solutions possible.

Either to Clip in a restrictive way based on the ChromaType(Ctype):

ChromaOffsetHor=2*(Ctype==1||Ctype==2)
ChromaOffsetVer=2*(Ctype==1)
$MVX_{Int} = Clip3(Tile_{Left} - Pos_x + ChromaOffsetHor, Tile_{Right} - Pos_x - (B_W - 1) - ChromaOffsetHor, MVX_{Int})$
$MVY_{Int} = Clip3(Tile_{Top} - POS_y + ChromaOffsetVer, Tile_{Bottom} - Pos_y - (B_H - 1) - ChromaOffsetVer, MVY_{Int})$ Or Clip as in outlined before without additional change due to chroma, but check whether:

4:2:0 (ChromaType=1 in HEVC)
$xPos + MVX_{Int} = Tile_{Left} + 1$ with $MVX_{Int}$ defined as for luma
$xPos + (B_W - 1) + MVX_{Int} = Tile_{Right} - 2$ with $MVX_{Int}$ defined as for luma
$yPos + MVY_{Int} = Tile_{Top} + 1$ with $MVY_{Int}$ defined as for luma
$yPos + (B_H - 1) + MVY_{Int} = Tile_{Bottom} - 2$ with $MVY_{Int}$ defined as for luma 4:2:2 (ChromaType=2 in HEVC)
$xPos + MVX_{Int} = Tile_{Left} + 1$ with $MVX_{Int}$ defined as for luma
$xPos + (B_W - 1) + MVX_{Int} = Tile_{Right} - 2$ with $MVX_{Int}$ defined as for luma And change $MVX_{Int}$ or $MVY_{Int}$ (for instance with +1 or depending on the fractional part rounding to the closest direction with +1 or −1) so that the prohibited condition(s) do not happen.

In other words, although the above description concentrated on one color component only and neglected the case that different color components of the pictures of the video might have different spatial resolutions, it might be the juxtaposition of different color components of different spatial resolution is taken into account in the tile independency constraint enforcement with this statement being true also for the modifications described hereinbelow, where the enforcement is, for example, applied to MI predictors rather than the final MI. Frankly speaking, a motion vector may be treated as sub-pel motion vector whenever any of the color components would use an interpolation filter with the patch being enlarged accordingly, and likewise the motion vectors to which the re-direction is performed are also selected in a manner avoiding any interpolation filtering which might be entailed for any of the color components crossing boundary 102 of the current tile 100*a*.

In accordance with alternative embodiments, the above-described embodiments where the constraint obeyance/enforcement has been applied to the finally signaled motion vector 154 (compare FIG. 10) are modified to the extent that the decoder applies the same concept, i.e., the constraint obeyance/enforcement, i.e., the clipping in case of motion vectors, onto the predictor 150 rather than the final motion vector or motion information 154. Thus, both, encoder and decoder act the same so as to enforce that all motion information predictors 150 obey the constraint that if a patch of block 104 would be placed according to the respective motion information predictor 150, i.e., if the motion information prediction residual 152 was zero, the patch lies within the current tile 100a. All the above-outlined details may be transferred onto these alternative embodiments.

However, as far as the encoder 10 is concerned, the just-outlined alternative embodiments lead to a different situation for the encoder: there is no longer ambiguity or "freedom" for the encoder to cause the decoder to use the same motion information for block 104 by signaling one of different motion information prediction residuals. Rather, once having selected the motion information to be used for block 104, the signaling within portion 140 is uniquely determined, at least with respect to a certain motion information predictor 150. The improvement lies in the following: as motion information predictors 150 are prevented from leading to conflicts with the tile-independency constraint, there is no need to "redirect such motion information predictors 150 by respective non-zero motion information prediction residuals 152 the signaling of which is usually more cost intensive in terms of bitrate than the signaling of a zero motion information prediction residual. Further, in case of establishing a list of motion information predictors for block 104, the automatic and synchronous enforcement that all motion information predictors by which such list of motion information predictors for block 104 is populated do not conflict with the tile-independency constraint increases the likelihood that any of these available motion information predictors is pretty close to the best motion information in terms of rate distortion optimization as the encoder is, anyway, obliged to select the motion information in such a manner that the tile-independency constraint is obeyed.

That is, while in current video coding standard, any MV clipping is carried out on the final MV, i.e. after the motion vector difference, if any, is added to the predictor, this is done with respect to the prediction and the correction of this prediction using the residual is done additionally here. When a predictor points out of the picture (potentially with boundary extension), if it points really far from the boundary, the motion vector difference will, probably, not contain any component in the direction that it is clipped, at least when after clipping the block lies in the boundary of the picture. Only, if the resulting motion vector points to a position in the reference picture that is inside the picture boundary would a motion vector difference make sense. However, it might be too costly to add such a big motion vector difference to reference a block within the picture compared to letting it be clipped to the picture boundary.

Accordingly, an embodiment would consist on clipping the predictors depending on the block position so that all MV predictors used from the neighbor blocks or temporal candidate blocks always point inside the tiles, within which the block is contained, and therefore a more remaining motion vector difference to be signaled for a good predictor is smaller and can be signaled more efficiently.

Figure 13:
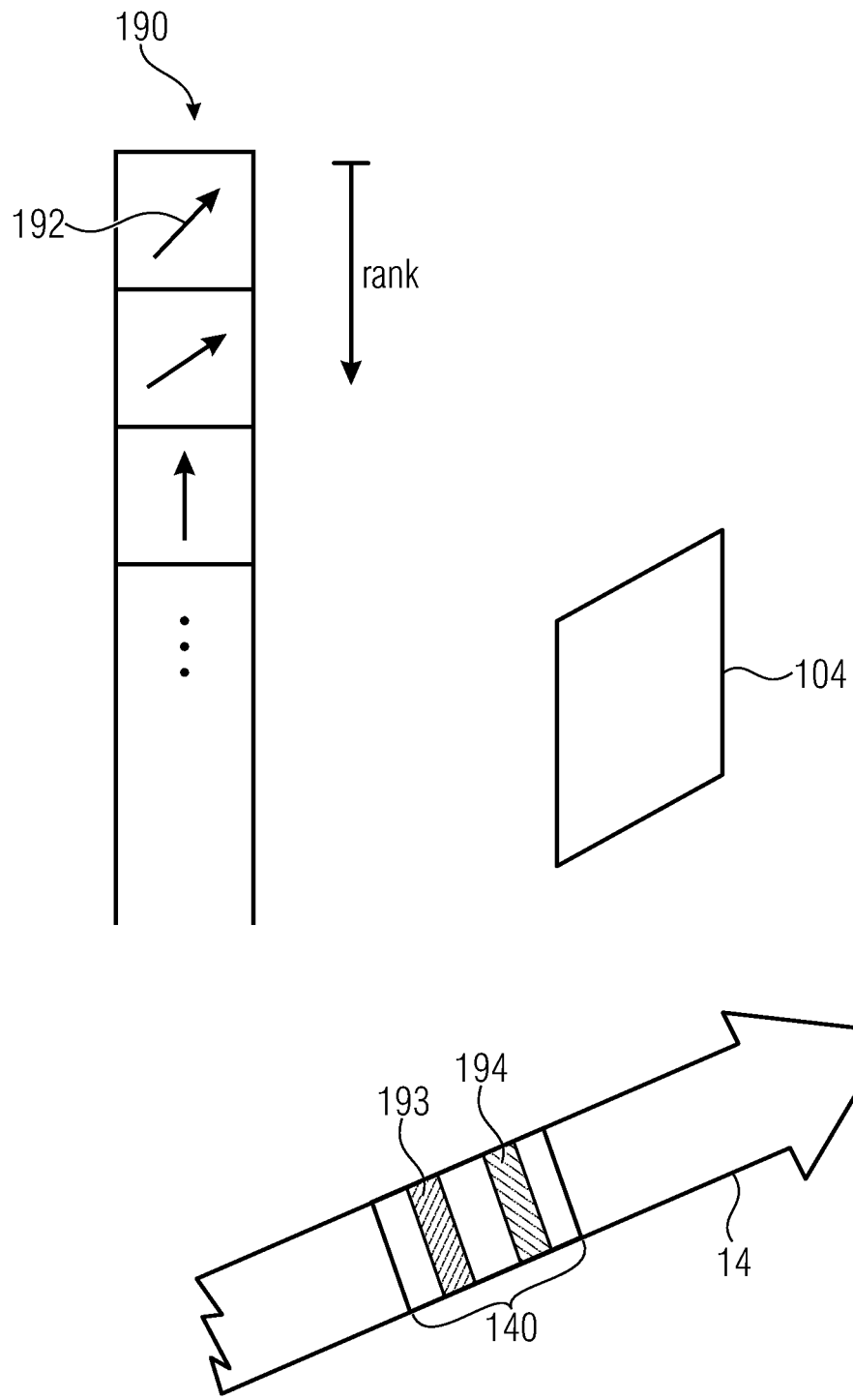
FIG. 13 shows a schematic diagram illustrating the possibility of applying the decoder's obeyance/enforcement functionality onto the derivation of motion information prediction, with additionally illustrating the optional construction of a motion information predictor candidate list.

An embodiment, making use of the just-mentioned motion vector predictor related enforcement of the tile-independency is depicted in FIG. 13. In particular, FIG. 13 shows what has often been mentioned above as a possibility, namely the circumstance that a list 190 of motion information predictor candidates 192 is established for block 104 according to certain rules and using a certain order. One of these motion information predictor candidates 192 is then chosen by the encoder for block 104 and signaled to be chosen within syntax portion 140 for block 104 by way of a respective pointer 193 which indicates the position of the selected motion information predictor candidate 192 in terms of its rank within list 190. The establishment of list 190 is done in the same manner at encoder and decoder side and involves, in accordance with a current embodiment, the tile-independency enforcement with respect to each motion information predictor candidate 192 by which list 190 is populated. Thus, all motion information predictors 192 in list 190 are not associated with any patch not being exclusively within the boundaries of the current tile to which block 104 belongs. A further syntax element 194 in portion 140 then indicates the motion information prediction residual, i.e., the motion vector difference 152, in case of the motion information predictor candidates 192 relating to motion vectors.

Figure 14:
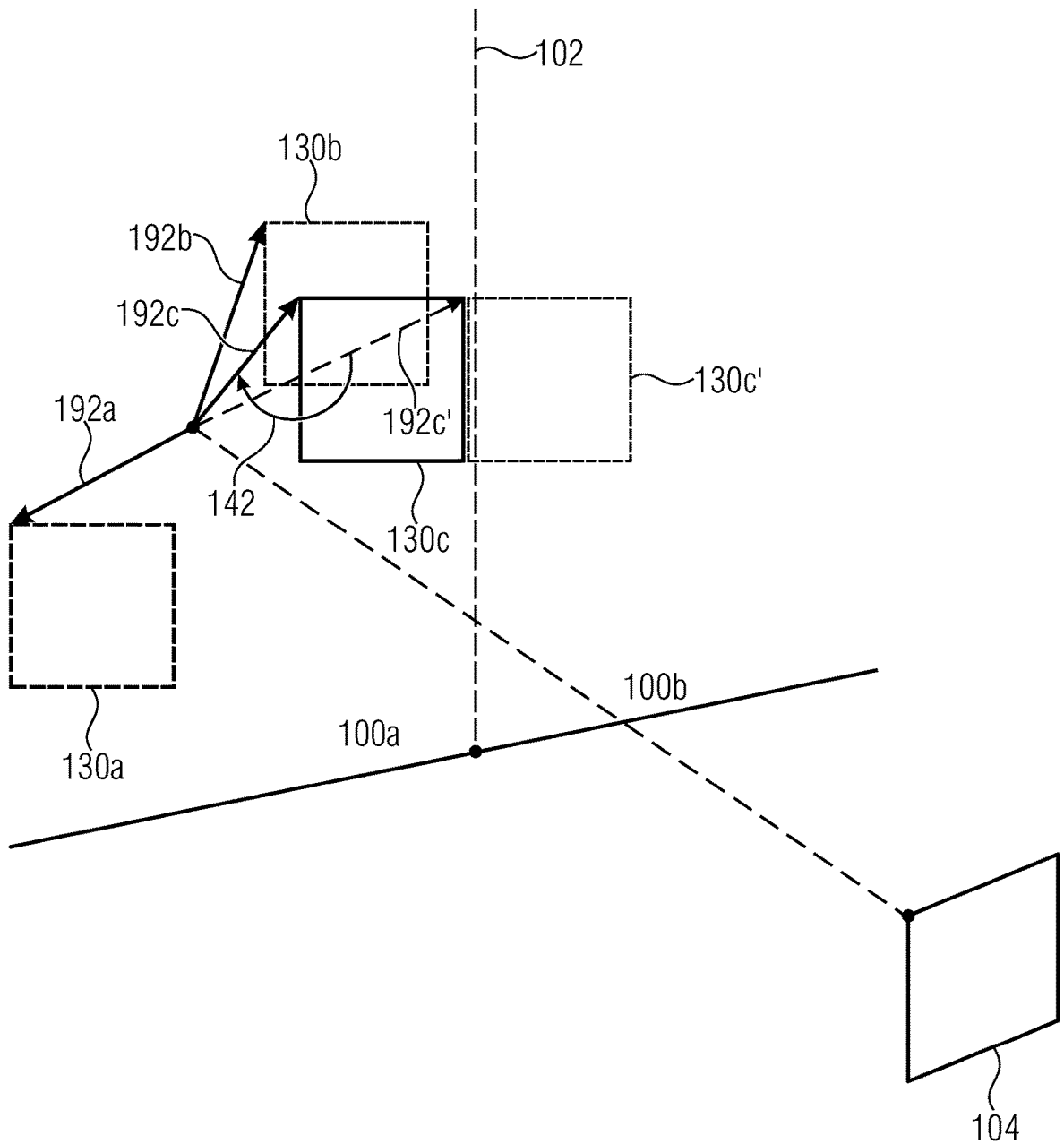
FIG. 14 shows a schematic diagram illustrating the non-invertible motion vector mapping involved in the decoder's obeyance/enforcement functionality and a resulting exemplary set of motion information predictor candidates when additionally, optionally construing a motion information predictor candidate list.

FIG. 14 shows the effect of subjecting each motion information prediction candidate 192 of list 190 to the tile-independency enforcement: for block 104, the patches 130a to 130c of three motion information predictor candidates 192a to 192c within list 190 are shown. Patch 130c, however, is associated with a motion information predictor candidate 192c, which is, however, actually the result of a redirection 142. That is, encoder and decoder had actually derived a motion information predictor candidate for block 104, indicated by dashed lines and by 192c'. This predictor 192c' would have had, however, led to a patch 130c' not within the boundary 102 of the current tile 100a. Accordingly, this motion information predictor candidate 192c' has been redirected to become the motion information predictor candidate 192c. The effect is the following: the likelihood that motion information predictor candidate 192c' would have had become the, in terms of great distortion sense, most effective motion information predictor candidate is rather low due the necessity of the encoder to accompany same with a non-zero motion information predictor residual. Accordingly, including such candidate 192c' into list 190 would most likely only lead to a waste of a candidate position within list 190. Rather, any of the predictors 192a-c may be selected by way of pointer 193 and most likely merely a small residual 194 needs to be transmitted to result by a combination of the residual vector 152 (compare FIG. 10) and the selected predictor such as 192c, to the final motion vector 154 (compare FIG. 10).

The concept of FIGS. 13 and 14 may, naturally, also applied to a single prediction 150 for the current block 104 without establishing a list 190 at all.

Figure 15:
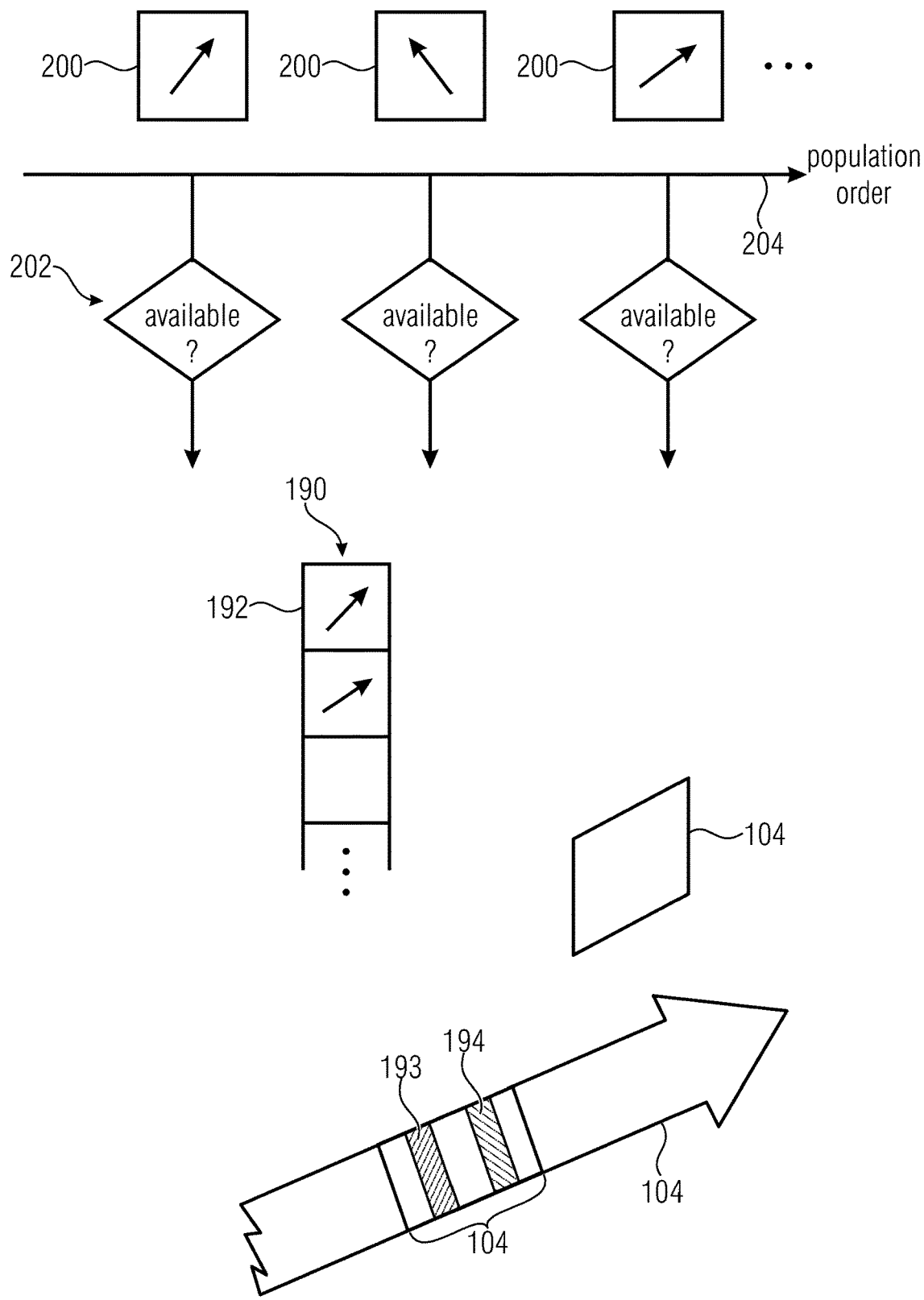
FIG. 15 shows a schematic diagram illustrating the possibility of rendering the candidate availabilities in populating the motion information predictor candidate list dependent on whether certain motion information predictor candidates conflict with the tile independence constraint.

An alternative concept with respect to motion information predictor candidate list construction/establishment is the subject of the embodiment described now with respect to FIG. 15. As already outlined above with respect to FIG. 13 as a possibility, list 190 may be populated by use of motion information predictor candidates which are, in turn, derived from previously coded/decoded blocks according to predetermined rules. These rules may, for instance, pertain to the way the corresponding previously coded/decoded block is located. It might be, for instance, that it is the spatially neighboring block to the left or the spatially neighboring block to the top of the current block 104. The derivation of the respective motion information predictor candidate may then simply be the adoption of the respective motion information used for the respective block in encoding/decoding same, i.e. the respective motion information predictor candidate for block 104 may be set to be equal to the respective motion information used for the respective block. Another motion information predictor candidate may stem from a block in a reference picture. Again, this might be a reference picture to which one of the candidates 192 relate, or another one. FIG. 15 shows such motion information predictor candidate primitives 200. Primitives 200 form a pool of motion information predictor candidates from which the entries in list 190 are populated according to some order 204 called population order. According to this order 204, encoder and decoder derive the primitives 200 and check their availability at 202. The population order is indicated at 204. The availability may, for instance, be denied because the corresponding block for the respective primitive 200, i.e. the block the motion information having been used to predictively encode/decode same, is not within the same tile 100*a* as the current block 104. In accordance with the embodiment of FIG. 15, however, the availability check 202 is accompanied, or comprises, the following check additionally or alternatively: namely the check whether the corresponding primitive 200 is in conflict with a tile-independency constraint. That is, not the origin for the respective primitive 200 is checked for availability, namely the block to the left, the block to the top of the current block 104 or some collocated block in a reference picture, whose motion information used to predictively code/decode same would be adopted to form primitive 200, but it is checked whether the motion vector predictor represented by such primitive 200, i.e. the motion information which is derived from the motion information used to predictively code/decode the previously coded/decoded block with which the primitive is associated, and which would be adopted to form primitive 200, would be checked as to whether same is associated with a patch 130 located within the current tile 100*a* without exceeding the boundary thereof. If not, the respective primitive would be marked as not being available and the next primitive would be stepped to. FIG. 15 illustrates, for instance, that the second candidate primitive 200 would not be available and that the first two motion information predictor candidates 192 in list 190 would, accordingly, be formed by the first and third candidate primitives 200 in order 204. In other words, another solution to the above problem is to change the derivation of availability flags for the motion vector list construction processes. This can be done in a way that motion vectors that use samples outside the targeted independently coded region (e.g. the currently coded motion constraint tile) are set to be unavailable given that a constraintFlag is set.

For instance, the following is the construction process for the motion vector predictor candidate list, mvpListLX.

```
i=0
  if(availableFlagLXA) {
    mvpListLX[i++]=mvLXA
    if(availableFlagLXB && (mvLXA!=mvLXB))
      mvpListLX[i++]=mvLXB
  } else if (availableFlagLXB)
    mvpListLX [i++]=mvLXB
  if (i<2 && availableFlagLXCol)
    mvpListLX [i++]=mvLXCol
  HMVP
  while(i<2) {
    mvpListLX[i][0]=0
    mvpListLX[i][1]=0
    i++
  }
```

It can be seen that when mvLXA and mvLXB are available but point outside a given MCTS, possibly more promising collocated MV candidates or Zero motion vector candidates are not entered into the list as it is already full. Therefore, it is advantageous to have a constraintFlag signalling within the bitstream that controls the derivation of availability of MV candidates in way to incorporate availability of reference samples with respect to spatial segment boundaries such as tiles.

In another embodiment, the availability derivation in context of bi-prediction may allow for a more granular description of the availability state and, hence, further allow populating the motion vector candidate list with mixed versions of partially available candidates.

For instance, if a current block is bi-predicted similar to its bi-predicted spatial neighbors, the above concept (availability marking dependent on referenced sample location being in the tile) would lead to the fact that a spatial candidate of which MV0 points outside of the current tile is marked as not available and hence, the whole candidate with MV0 and MV1 are not entered into the candidate list. However, MV1 is a valid reference within the tile. In order to make this MV1 accessible through the motion vector candidate list, MV1 is added to a temporary list of partially available candidates. Combinations of the partial candidates in that temporary list can subsequently also be added to the final mv candidate list. For instance, mixing MV0 of spatial candidate A with MV1 of spatial candidate B or Zero motion vectors or HMVP candidate components.

The latter hint made clear that the process depicted in FIG. 15 might be performed by encoder and decoder a little bit more sophisticated in case of block 104 being of the bi-predictive type. In this case, two motion vectors for two different reference pictures are conveyed by each candidate primitive 200. One possibility would have been to mark such candidate primitive 200 as being unavailable in case of one of the motion vectors leading to a tile-independency conflict. The pair of motion vectors would, thus, be skipped in population order and not be added to the list 190. In accordance with an alternative, however, the tile-independency check is performed hypothesis individually. That is, it might be that for a certain candidate primitive 200, one motion vector leads to a tile-independency conflict, while the other does not. In that case, the non-conflicting motion vector hypothesis may be added to a certain substitutional list of substitutional motion information predictors. In case of any need, i.e., in case no further candidate primitive 200 being available in population order 204, encoder a decoder could then form another one or more than one motion information predictor candidates 192 for list 190 out of single hypothesis motion information predictors and the substitutional list, such as combining a pair of them or one entry and the substitutional list with a default motion information predictor such as a zero motion vector.

To finish the description of FIG. 15, please note remaining details described with respect to the previous figures may be added. For instance, such details may pertain to the pointer 193 and the residual 194 and details concerning the patch size and the actual usage of the finally signaled motion information for predicting block 104.

The embodiment described next, deals with motion information prediction candidates having their origin in blocks of a certain reference picture. Again, this reference picture needs not to be one from which the actual inter-prediction is performed. It might be though. For distinguishing the reference pictures serving for MI (motion information) prediction from the reference picture containing a patch 130, an apostrophe is used for the formers in the following.

Figure 16:
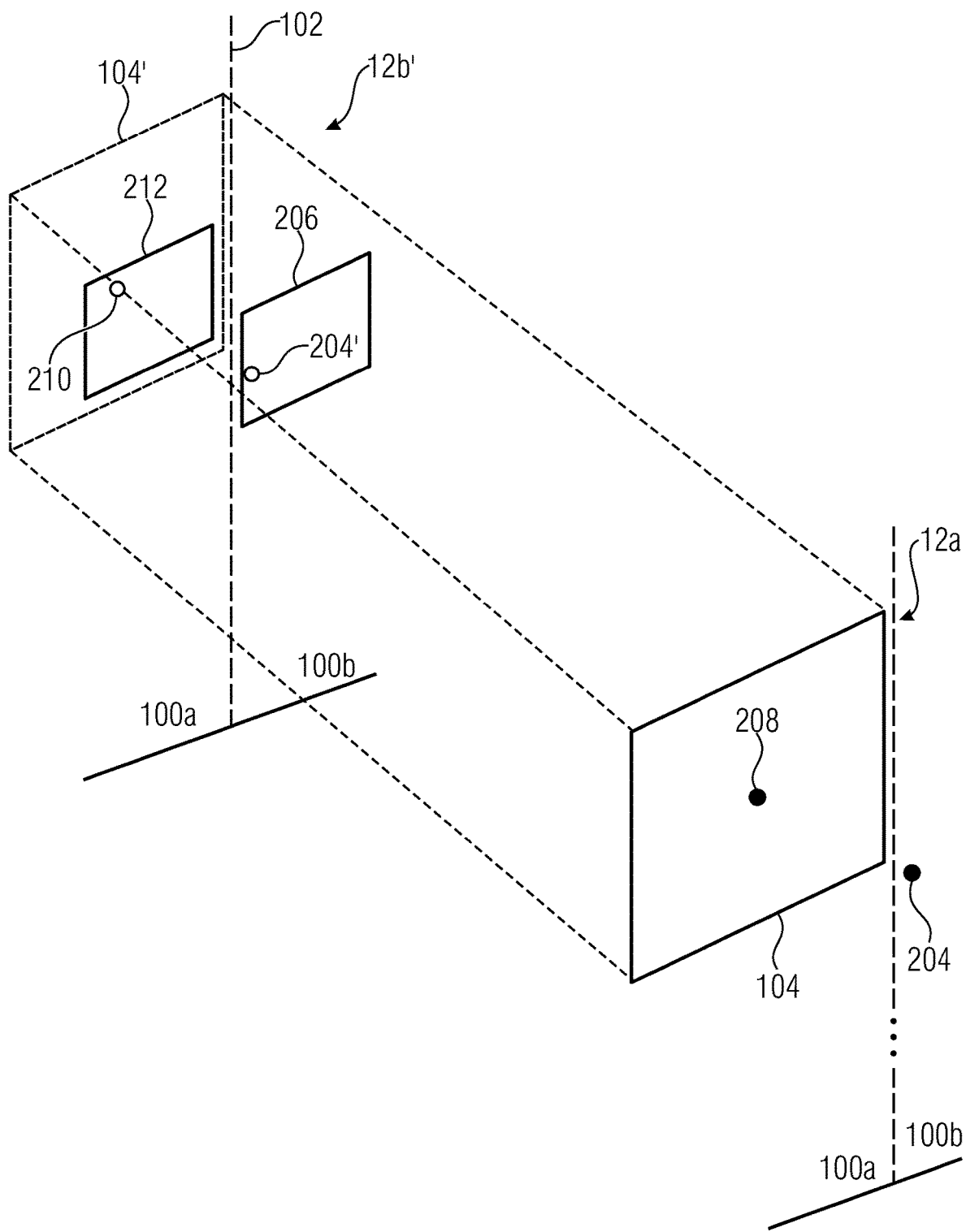
FIG. 16 shows a schematic diagram illustrating the possibility of varying the reference block identification with respect to the derivation of a temporal motion information predictor candidate dependent on whether the inter-predicted block adjoins certain tile sides.

FIG. 16 shows the currently inter-predicted block 104 in the current picture 12*a* and its collocated portion, i.e., un-displaced footprint, 104' within the reference picture 12*b'*. It turned out to be cost-effective in terms of RD performance if a temporal motion information predictor candidate (primitive) is formed by use of motion information used for a block in the reference picture 12*b'* which is determined in the following manner: advantageously, the block in the reference picture 12b' is the one including a predetermined location 204' in the reference picture 12b, namely the sample position collocated to a certain alignment location 204 in the current picture 12a which has a predetermined locational relationship to block 104. In particular, it's the sample position diagonally neighboring the lower right sample of block 104, but lying outside of block 104. Location 204 is, thus, located offset relative to block 104 along the horizontal and vertical direction in the example of FIG. 16. The block of reference picture 12b' which comprises location 204' is indicated in FIG. 16 by reference sign 206. Its motion information is used to derive, or immediately represent, the temporal motion information predictor candidate (primitive) in case of being available. Availability may, however, not apply in case of, for instance, position 204' and 204 lying outside the picture or block 206 not being an inter-predicted block but, for instance, an intra-predicted block. In such a case, i.e., in case of non-availability, another alignment location 208 is used to identify a source block or origin block within the reference picture 12b. This time, the alignment location 208 is positioned inside block 104 such as centered therein. The corresponding location in the reference picture is indicated by reference sign 210. The block comprising location 210 is indicated by reference sign 212 and this block is, by substitute, used in order to form the temporal motion information predictor candidate (primitive), namely by using its motion information using which this block 212 has been predicted.

In order to avoid problems which would result if the just-mentioned concept would be used for every block 104 within the current picture 104, the following alternative concept is applied. In particular, encoder and decoder check whether block 104 adjoins a predetermined side of the current tile 100a. This predetermined side is, for instance, the right-hand side boundary of the current tile 100a and/or the bottom side of this tile 100a as in the present example, for instance, the alignment location 204 is offset relative to block 104 both horizontally and vertically. Thus, if block 104 adjoins one of these sides, encoder and decoder skip using the alignment location 204 in order to identify the source block 206 for the temporal motion information predictor candidate (primitive) and solely use the alignment location 208, instead. The latter alignment location only "hits" blocks within the reference picture 12b lying within the same tile 100a as the current block 104 does. For all other blocks, not adjoining the right-hand side or bottom side of the current tile 100a, the temporal motion information predictor candidate (primitive) derivation may be done including the usage of the alignment location 204.

It should be noted, however, that many variations are feasible with respect to the embodiment of FIG. 16. Such possible modifications from the description brought forward with respect to FIG. 16 relate, for instance, to the exact positions of the alignment locations 204 and 208.

In other words, a typical state of the art video coding specification also heavily relies on the concept of gathering motion vector predictors in so-called candidate lists at different stages of the coding process. The following describes concepts in context of MV candidate list construction that allow to a higher coding efficiency for inter-prediction constraint coding.

A Merge Candidate List may be construed as follows
I=0
if(availableFlagA$_1$)
   mergeCandList[i++]=A$_1$
if(availableFlagB$_1$)
   mergeCandList[i++]=B$_1$
if(availableFlagB$_0$)
   mergeCandList[i++]=B$_0$
if(availableFlagA$_0$)
   mergeCandList[i++]=A$_0$
if(availableFlagB$_2$)
   mergeCandList [i++]=B$_2$
if(availableFlagCol)
   mergeCandList[i++]=Col When slice_type is equal to B, a derivation process for combined bi-predictive merge MV candidates is performed to fill up the candidate list if there are not enough candidates in many video codec specifications.

The candidates are combined by taking the L0 component of one MV candidate and L1 component of another MV candidate with different combinations.

The zero motion vector merging candidates are added if there are not enough candidates in the list.

The relevant issue with the merging list in context of inter-prediction constraints comes when considering the collocated MV candidate (Col). If the collocated block (not the right bottom but the central collocated) is not available, it is not possible to know without parsing the neighbouring tile in the reference picture, whether a Col candidate exists or not. Therefore, the merging list could be different when decoding all tiles or only one or tiles are decoded in a different arrangement then during encoding. Hence, MV candidate lists on encoder and decoder side can mismatch and candidates from a certain index on (the col index) cannot be safely used.

The above embodiment of FIG. 16 that avoids the above problem of MV candidate list mismatches is, for the right-most blocks and the lower-most blocks in a tile, to have the center-collocated block as Col candidate which belongs to the current tile, and not the right-bottom collocated block which does not belong to the current tile.

An alternative solution would be to change the list construction in terms of population order 204. In particular, when using the concept described with respect to FIG. 16, it is possible to use the temporal motion information predictor candidate (primitive) relatively early in the list construction such as, for instance, the first primitive 200 checked for availability (compare FIG. 15). The tile boundary awareness at encoder and decoder side would guarantee that list mismatches do not occur. However, another possibility would be shifting such temporal motion information predictor candidate (primitive) towards the end of list 190 and shift combined spatial motion information candidates, such as combined spatial motion vectors, before the temporally collocated one determined, advantageously, based on block 206 and only in a subsidiary manner based on block 212. Related to the above pseudo code, this would mean that Col, the candidate determined primarily based on block' 206 MI and based on block's 212 MI only as a substitute, would be moved to the end of the finished list 190 after the current state of the art list construction. This change in the population order could be done tile boundary aware: that is, encoder and decoder will change the population order by shifting the Col candidate to the end of the list 190, only with respect to blocks 104 adjoining the right or bottom side of the current tile and leave the population order for the others in the other manner, namely in a manner where the Col precedes a combined spatial motion information candidate.

Naturally, it would be feasible to, for sake a more unified creation of the motion vector candidate list, to carry out the population order variation just-described for all blocks 104 within a tile rather than only those adjoining certain sides.

Figure 17:
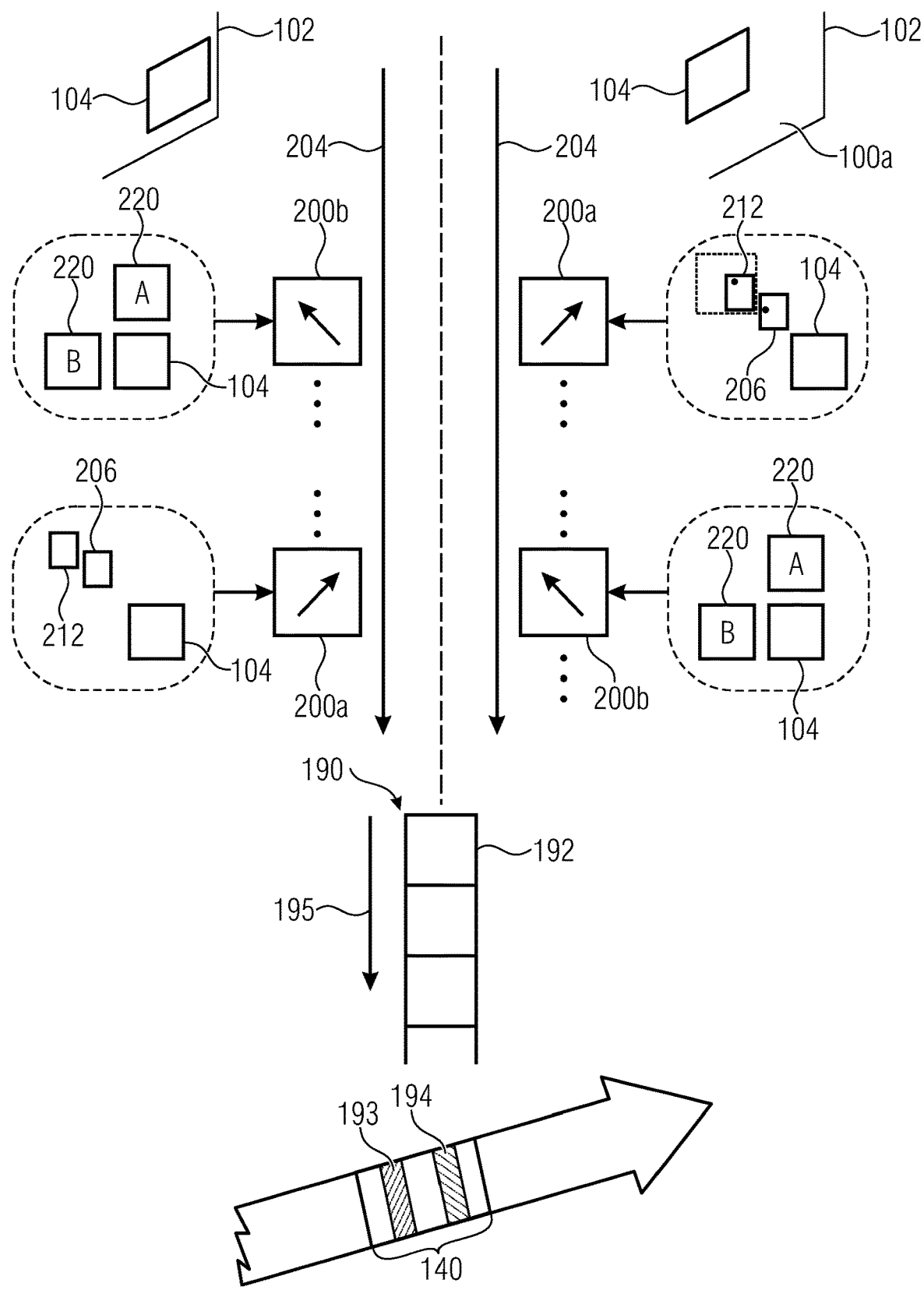
FIG. 17 shows a schematic diagram illustrating the possibility of rendering the population order in populating the motion information predictor candidate list dependent on whether the inter-predicted block adjoins certain tile sides, here with respect to a juxtaposition of temporal motion information predictor candidate and one or more spatial motion information predictor candidates.

FIG. 17 illustrates the tile boundary aware population order change. The case of an inter-predicted block 104 adjoining one of the sides of the current tile in question, namely the right-hand side or the bottom side is depicted in the left half of FIG. 17, while the case of block 104 being somewhere with the current tile 100a or, to be more precise, distance from the specific sides of the current tile 100a is depicted at the right hand side of FIG. 17.

Using 200a, motion information predictor candidate primitives are indicated, which are derived in the aforedescribed manner according to which a motion information of block 206 may be used, with using block 212's motion information only as a substitute in case of 206 being, for instance, of the intra-coded type. The block underlying primitive 200a is also called an aligned block which might be 206 or 212. Another motion information predictor candidate primitive 200b is shown. This motion information predictor candidate primitive 200b is derived from motion information of spatially neighboring blocks 220 which spatially neighbor the current block 104 at sides facing away the specific sides of tile 100a, i.e. the upper and the left-hand side of current block 104. For instance, a mean or median of the motion information of the neighboring blocks 220 is used to form the motion information predictor candidate primitive 200b. The population direction 204, however, is different in both cases: in case of block 104 adjoining one of the specific sides of current tile 100a, the combined spatial candidate primitive 200b precedes the temporally collocated candidate primitive 200a and in the other case, i.e. in case of block 104 not adjoining any of the specific sides of current tile 100a, the order is changed so that the temporally collocated candidate primitive 200a is used for populating list 190 earlier in rank order 195 along which pointer 193 points into list 190 than the combined spatial candidate primitive 200b.

It should be noted, that many details not specifically discussed with respect to FIG. 17 may be adopted from any previous embodiment such as the one concerning FIG. 16 relating to primitive 200a. Primitive(s) 200b may be obtained differently as well.

Figure 18:
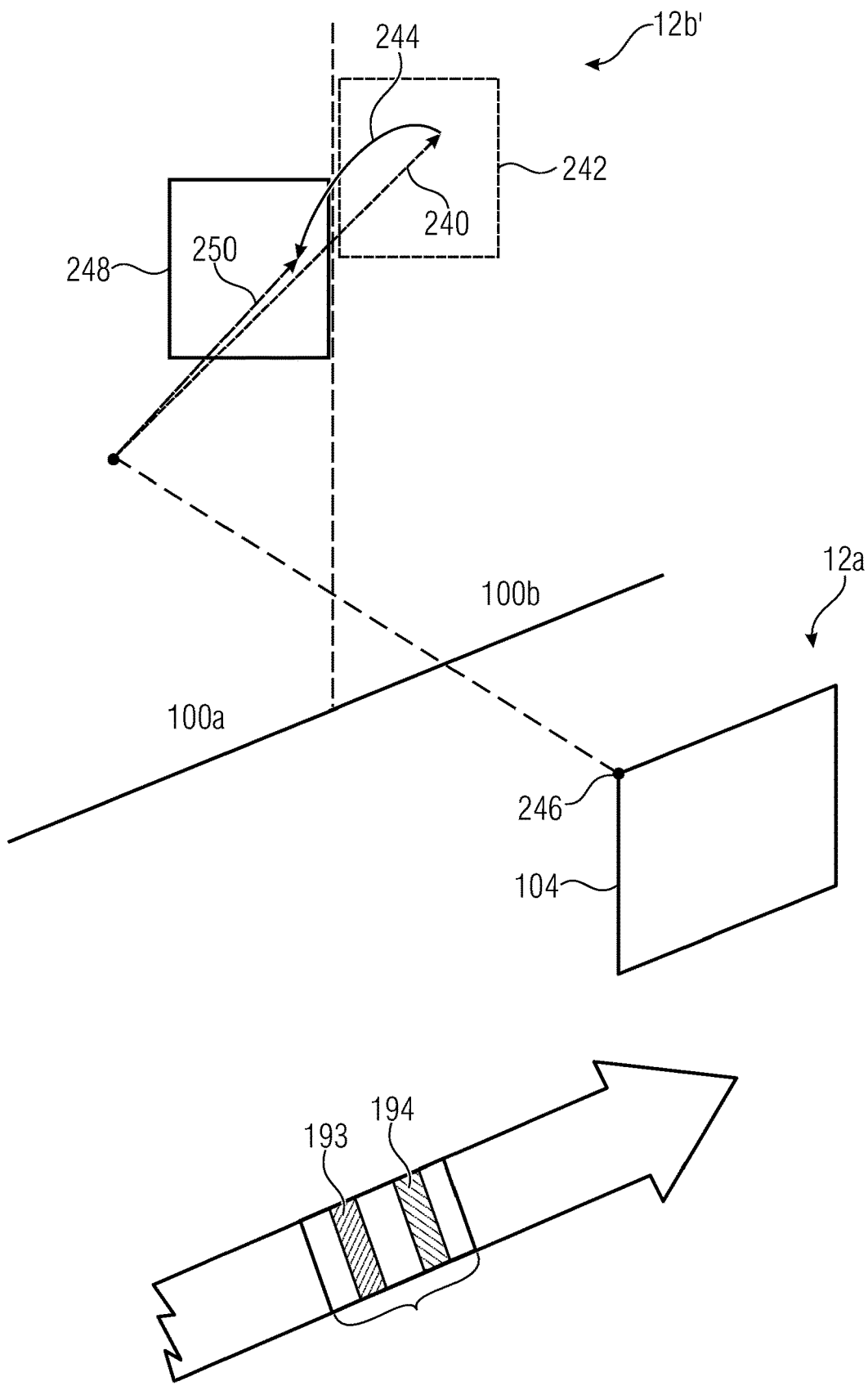
FIG. 18 shows a schematic diagram illustrating the possibility of applying the decoder's obeyance/enforcement functionality onto predicted motion vectors used for the derivation of a temporal motion information predictor candidate.

FIG. 18 illustrates a further possibility of attaining tile-independent coding in an efficient manner. Here, a technique for deriving a temporal motion information prediction candidate (primitive) is applied according to which an otherwise predicted motion vector 240 is used by encoder and decoder so as to locate or identify a predetermined block 242 in the reference picture 12b whose motion information, i.e. the motion information used to code/decode block 242, is then used to derive the motion information prediction candidate (primitive). The motion vector 240 may be spatially predicted, for instance. It may stem from one of the other candidates in list 190, not stemming from the primitive which FIG. 18 aims at. In accordance with the embodiment described with respect to FIG. 18, encoder and decoder check whether motion vector 240 points, relative to the position of block 104, to a point outside the current tile 100a or not. In case of FIG. 18, it is illustrated that the predicted motion vector 240 points outside tile 100a. This motion vector 240 is, therefore, clipped by a clipping operation 244 so as to, starting from block 104 or, to be more precise, from a predetermined alignment location 246 thereof, stay within the boundaries 102 of the current tile 100a, i.e. so as to not point outside tile 100a. The block 248, to which the thus clipped motion vector 250 points relative to block 104, is then used as a basis for deriving the temporal motion information prediction candidate (primitive) such as by simply adopting the motion information using which block 248 has been predicted.

Figure 19:
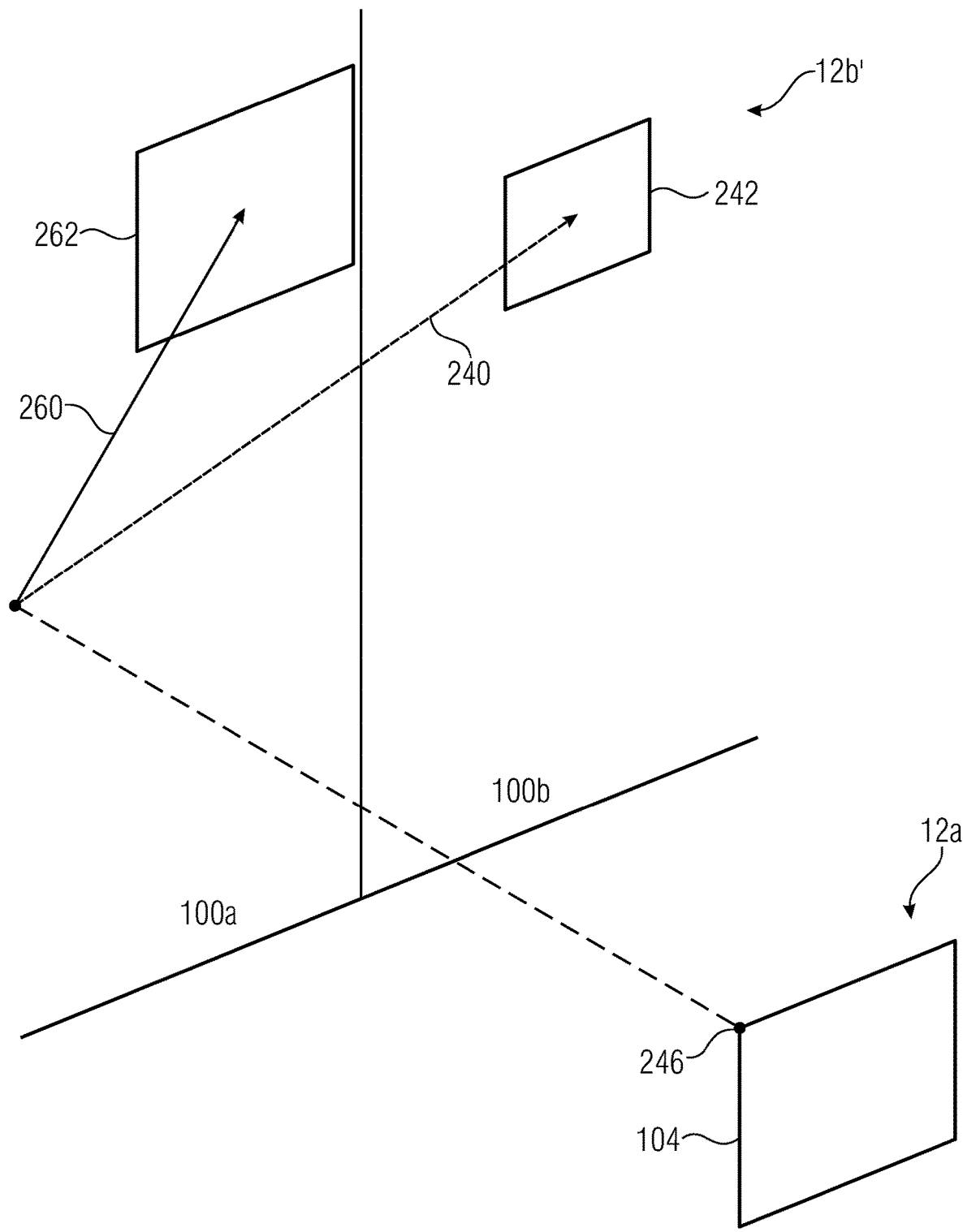
FIG. 19 shows a schematic diagram illustrating an alternative to the concept of FIG. 18 where a substitute predicted motion vector is used in case of a conflict of the first predicted motion vector with the tile independence constraint

Another possibility is depicted in FIG. 19. Here, encoder and decoder test a first predicted motion vector 240 first. By doing this, they check whether this first predicted motion vector points outside tile 100a. If so, they use another predicted motion vector 260 to derive the temporal motion information prediction candidate (primitive), namely by adopting the motion information using which a block 262 has been predicted onto which the second predicted motion vector 260 points. In FIG. 19, for instance, it has been illustrated that the first predicted motion vector 240 points outside the current tile 100a so that block 242, onto which this motion 240 points, lies outside the current tile 100a in the reference picture 12b. Motion vector 260, however, does not point outside current tile 100a. If the latter would be the case, the respective temporal motion information prediction candidate (primitive) could be marked as being non-available.

In other words, in a usage scenario involving independently coded spatial segments such as MCTS, the above described ATMVP procedure needs to be restricted to avoid dependencies between MCTS.

In the subblock merging candidate list construction, subblockMergeCandList, is constructed as follows, with the first candidate SbCol being the sub-block temporal motion vector predictor:

i=0
if(availableFlagSbCol)
    subblockMergeCandList[i++]=SbCol
if (availableFlagA && i<MaxNumSubblockMergeCand)
    subblockMergeCandList[i++]=A
if(availableFlagB && i<MaxNumSubblockMergeCand)
    subblockMergeCandList[i++]=B
if(availableFlagConst1 &&
    i<MaxNumSubblockMergeCand)
    subblockMergeCandList[i++]=Const1
if(availableFlagConst2 &&
    i<MaxNumSubblockMergeCand)
    subblockMergeCandList[i++]=Const2
if(availableFlagConst3 &&
    i<MaxNumSubblockMergeCand)
    subblockMergeCandList[i++]=Const3
if(availableFlagConst4 &&
    i<MaxNumSubblockMergeCand)
    subblockMergeCandList[i++]=Const4
if(availableFlagConst5 &&
    i<MaxNumSubblockMergeCand)
    subblockMergeCandList[i++]=Const5
if(availableFlagConst6 &&
    i<MaxNumSubblockMergeCand)
    subblockMergeCandList[i++]=Const6

It is advantageous to ensure that correlated block in a reference frame resulting from the temporal vector does belong to the spatial segment of the current block.

The location of the collocated prediction block is constrained to be located in the following way: the motion vector mvTemp, i.e. the motion information used to locate the collocated sub-block in the reference picture, is clipped to be contained within the collocated CTU boundaries. This ensures that the collocated prediction block is located in the same MCTS region as the current prediction block.

Alternatively, to the above clipping, when the mvTemp of a spatial candidate does not point to a sample position within the same spatial segment (tile), the next available MV candidate from the MV candidate list of the current block is selected until a candidate is found that results in a reference block that is located within the spatial segment.

The embodiment described next deals with another effective coding tool to reduce bitrate or to efficiently code video. According to this concept, a motion information conveyed within the data stream for block 104 allows decoder and encoder to define a more complex motion field within block 104, i.e. not just a constant motion field, but a varying motion field. This motion information determined, for instance, two motion vectors of the motion field for two different corners of block 104 as exemplarily depicted in FIG. 5. Decoder and encoder are, thus, in a position to derive from the motion information a motion vector for each of sub-blocks into which block 104 is partitioned. A regular partitioning into 4×4 sub-blocks 300 is exemplarily depicted in FIG. 20, but the partitioning into sub-blocks 300 neither needs to be regular nor is the number of sub-blocks restricted to 16. The sub-partitioning into sub-blocks 300 may be signaled within the data stream or may be set by default. Thus, each sub-block yields a motion vector which indicates a translational displacement between this sub-block 300 and the corresponding patch 302 in the reference picture 12b from which the respective sub-block 300 is to be predicted.

Figure 20:
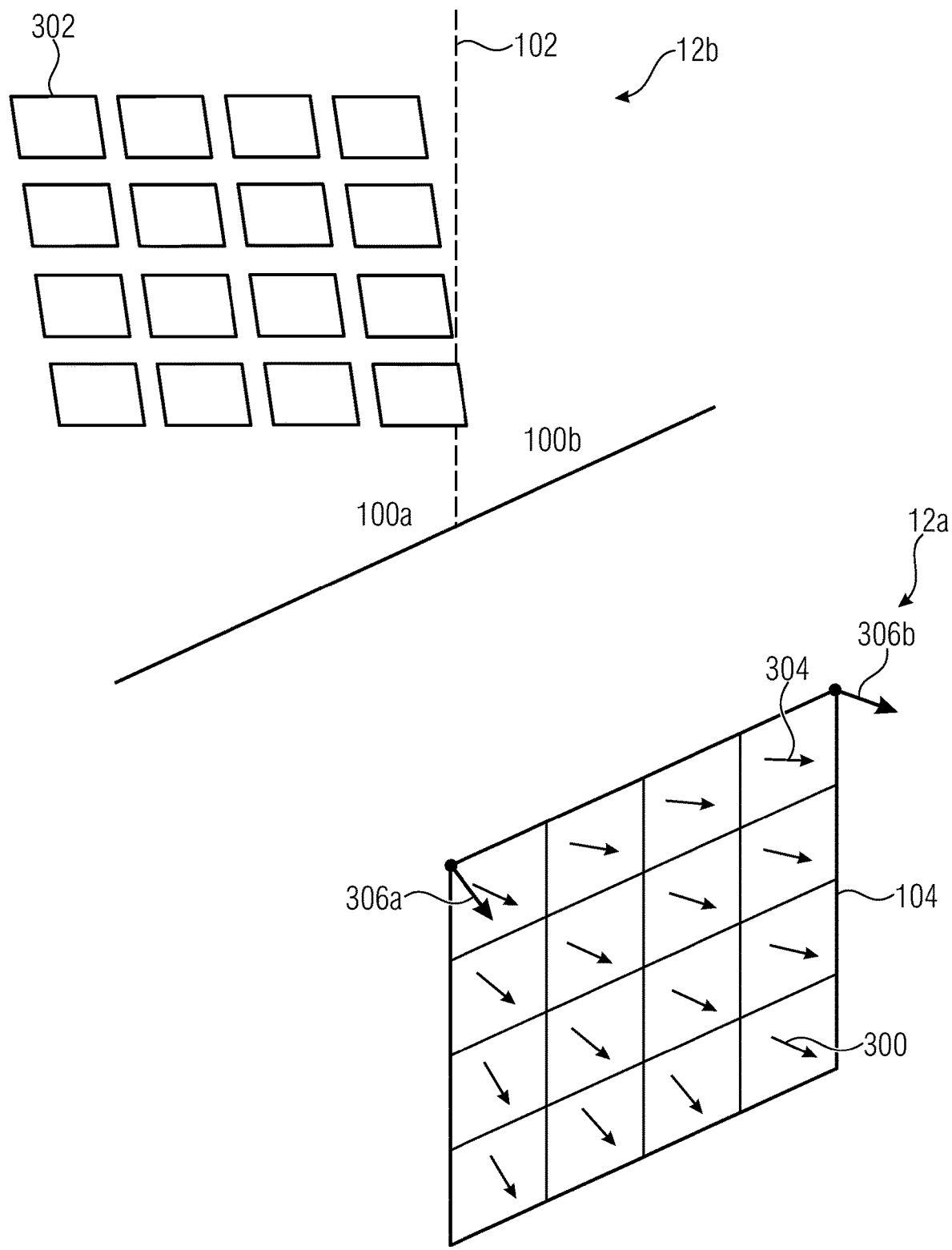
FIG. 20 shows a schematic diagram illustrating motion information derivation for sub-blocks of a current inter-predicted block according to an affine motion model for illustrating different concepts for the decoder assisting in attaining the tile independence constraint.

In order to avoid tile-independency contradiction, encoder and decoder act as follows in accordance with the present embodiment. The derivation of the sub-block motion vectors 304 on the basis of the motion information conveyed in the data stream exemplarily represented by two motion vectors 306a and 306b in FIG. 20 is performed by encoder and decoder in the same manner. The resulting sub-block motion vectors 304 assume a preliminary state. In accordance with a first embodiment, the decoder subjects each of the preliminary sub-block motion vectors 304 to the above-outlined tile-independency enforcement described above with respect to FIG. 9, for instance. Thus, for each sub-block, the decoder would test the corresponding sub-block motion vector 304 whether it leads to the corresponding patch 302 of the respective sub-block extending beyond the boundaries of the current tile 100a. If yes, the corresponding sub-block motion vector 304 is treated correspondingly. Each sub-block 300 would then be predicted using its sub-block motion vector 304 which, in turn, might have re-directed. The encoder does the same so that all predictions of the sub-blocks 300 are the same at encoder and decoder side.

Alternatively, the two motion vectors 306a and 306b are redirected so that none of the sub-block motion vector 304 leads to tile dependency. Thus, decoder side clipping of vectors 306a and 306b could be used to this end. That is, as described above the decoder would treat the pair of motion vectors 306a and 306b as motion information and the composition of patches 302 of the sub-blocks 3000 as the patch for block 104 and enforce that the composed patch would not conflict with the tile independency. Likewise, motion information corresponding to motion vector pair 306a and 306b could be removed from a candidate list as taught above in case the composed patch reaches out to another tile. Or a correcting with a residual is performed by the encoder, i.e. adding corresponding MV differences 152 to the vectors 306a and 306b.

In accordance with an alternative, those sub-blocks 300 for which the corresponding patch 302 exceeds the tile boundaries of the current tile 100a are predicted in a different manner such as, for instance, using intra-prediction. This intra-prediction may, of course, be performed after having inter-predicted the other sub-blocks of block 104 for which the corresponding sub-block motion vector 304 did not raise any tile-independency conflict. Further, even the prediction residual conveyed in the data stream for these non-conflicting sub-blocks might already have been used at encoder and decoder side to reconstruct the inner of these non-conflicting sub-blocks, before performing the intra-prediction of the conflicting sub-blocks.

In a usage scenario involving independently coded spatial segments such as MCTS, the above described affine motion procedure needs to be restricted to avoid dependencies between MCTS.

When MVs of the sub-block motion vector field lead to sample positions for the predictor that are not within the spatial segment boundary, the sub-block MV are individually cropped to sample positions within the spatial segment boundary.

Additionally, when MVs of the sub-block motion vector field lead to sample positions for the predictor that are not within the spatial segment boundary, the resulting predictor samples are discarded and new predictor samples are derived from intra-prediction techniques, e.g. employing an angular prediction mode derived on neighboring adjacent and already decoded sample areas. The samples of the spatial segment used in this scenario may belong to neighbor block as well as the surrounding sub-blocks of the current block.

Even alternatively, the motion vector candidates are checked for the resulting position of the predictor and whether the predictor samples belong to the spatial segment. If this is not the case, the resulting sub-block motion vectors are more likely to also no point to sample positions within the spatial segment. Hence, it is advantageous to crop motion vector candidates that point to sample position outside the spatial segment boundaries to positions within the spatial segment boundaries. Alternatively, modes using the affine motion model are disabled in such a scenario.

Another concept relates to history-based motion information prediction candidate (primitive) construction. Same may be placed at the end of the afore-mentioned population order 204 so as to cause no mismatches. In other words, the adding of HMVP candidates to a motion vector candidate list introduce the same problem as described before, that when the availability of temporally collocated MVs changes after encoding due to changes in the tile layout during decoding, the candidate list on decoder side mismatches wrt the encoder side and the indices after the Col cannot be used if such a usage scenario is envisioned. The concept here is similar in spirit to the above in which the Col candidates are shifted to after the HMVP the end of the list, when used.

For a creation of the MV candidate list, the above concept can be carried out for all blocks within a tile.

It should be noted that the placement of the history-based motion information predictor candidate within the population order may alternatively be done in a manner depending on an inspection of the motion information currently contained in the history list of stored motion information of the most recently inter-predicted blocks. For instance, some central tendencies such as median, mean or the like, of the motion information contained in the history list may be used to detect by encoder and decoder how likely it is that for the current block the history-based motion information predictor candidate would in fact lead to a tile-independency conflict. If, for instance, in accordance with some average, the motion information contained in the history list points towards a center of the current tile, or, more generally speaking, points, from the current position of block 104, to a position sufficiently far away from the boundaries 102 of the current tile 100a, it might be assumed that it is sufficiently unlikely that the history-based motion information predictor candidate leads to a tile-independency conflict and accordingly, in that case, the history-based motion information predictor candidate (primitive) may be arranged within population order earlier in population order than compared to cases where, an average, the history list points near to or even beyond boundaries 102 of current tile 100a. In addition to the central tendency measure, a dispersion measure of the motion information contained in the history list may be used as well. The larger the dispersion is, such as the variants or the like, the higher the likelihood may be that the history-based motion information predictor candidate provokes a tile-independency conflict and the same should be placed further towards the end of the candidate list 190.

Figure 21:
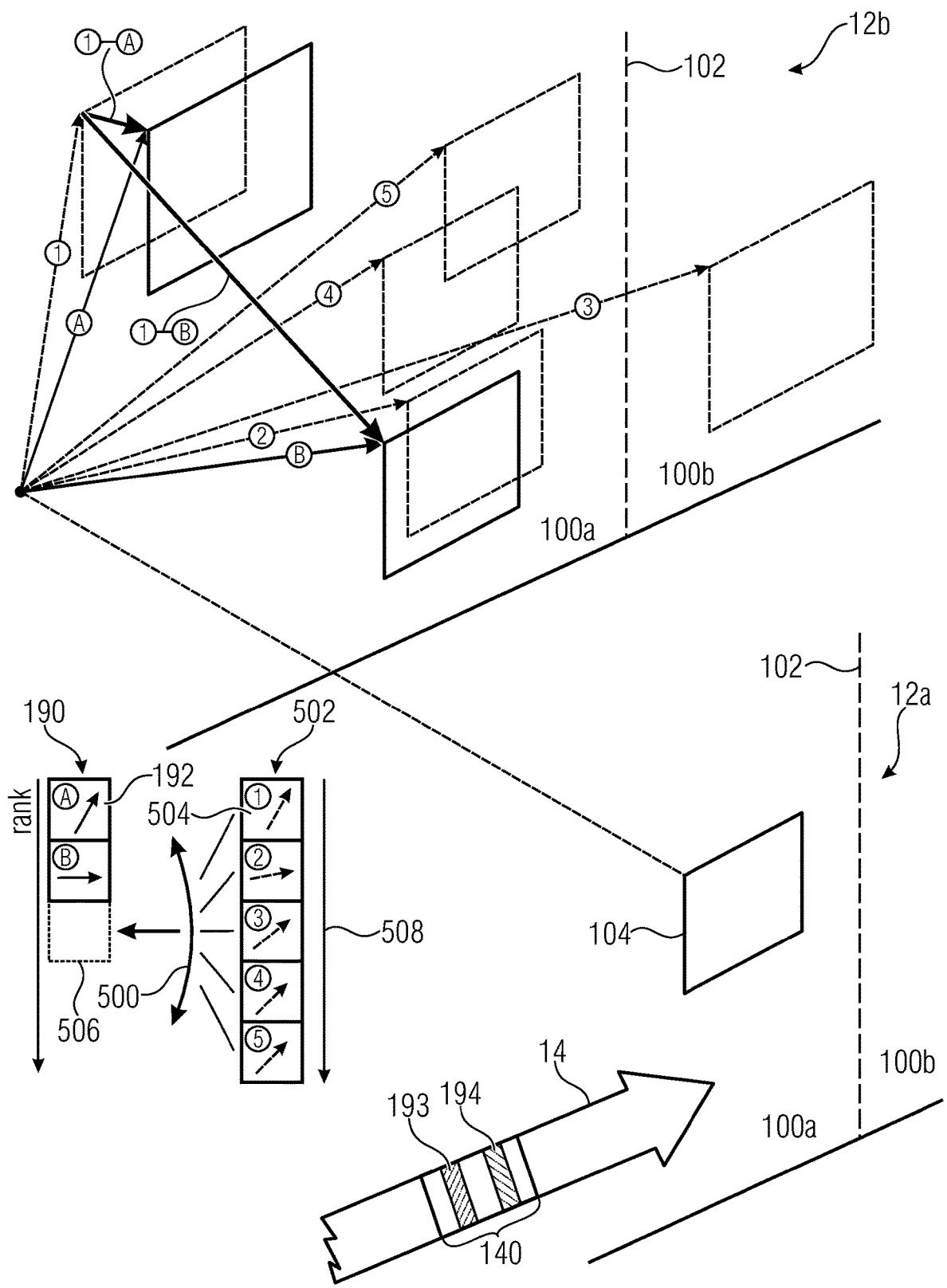
FIG. 21 shows a schematic diagram illustrating the selection of an History based motion information candidate for populating a motion information candidate list depending on the motion information of candidates by which the list is populated so far, for improving the resulting candidate list.

FIG. 21 presents a concept improving the population of a motion information predictor candidate list 190 with a motion information predictor candidate selected 500 out of a motion information history list 502 which buffers a collection of most recently used motion information, i.e., motion information of most recently coded/decoded inter-predicted blocks. That is, each of the entries 504 of list 502 stores motion information having been used for one of the most recently coded/decoded inter-predicted blocks. The buffering in history list 502 may be performed by encoder and decoder in a first-in-first-out manner. Different possibilities exist for keeping the content or entries of history list 502 updated. As the concept outlined with respect to FIG. 21 is useful both in case of using tile-based independent coding as well as when not using tile-based independent coding, encoder and decoder may restrict the gathering area of the inter-predicted blocks the motion information of which is used to fill the entries 504 of history list 502 may be restricted to individual tiles 100, i.e., the current tile 100a when inspecting the currently coded block 104, or may be a whole picture in case of not using tile-based independent coding. Further, the concept described with respect to FIG. 21 is not necessarily used in concept with the aspect described above according to which a history-based motion information predictor candidate is shifted within motion information predictor candidate list 190 towards the end, at least behind the spatial candidates such as the combined spatial candidates. Rather, the concept outlined with respect to FIG. 21 in the following merely assumes that there are motion information predictor candidates 192 using which the motion information predictor candidate list 190 has already been populated at the time of selecting 500 a history-based motion information predictor candidate out of history list 502. As a final note, even if tile-based independent coding is used in case of FIG. 21, then the concept of FIG. 21 may be combined with or may not be combined with, any of the concepts described above where the decoder performs the tile-independency enforcement on the finally signaled motion information for block 104 or on the motion information predictor candidates entered into list 190. In the following description of FIG. 21, it is assumed that tile-based independent coding applies, but that the decoder does not perform the tile-independency enforcement with respect to the motion information predictor candidates 192.

As shown in FIG. 21, at the time of coding/decoding inter-predicted block 104, encoder and decoder establish the motion-information predictor candidate list 190. FIG. 21 exemplarily assumes that the motion-information predictor candidate list 190 has already been populated by two motion information predictor candidates 192, indicated as A and B in FIG. 21. The "two" is, naturally, merely an example. In particular, it should be recalled that the number of candidates 192 using which list 190 has already been populated for a block 104 at the time of selecting 500 a history-based candidate for the population of list 190 by another history-based predictor candidate depends on the availability of inter-predictor blocks spatially around and at some collocated positions in other reference pictures. The fact, however, that FIG. 21 exemplarily shows two candidates 192 as already existing in list 190 at the time of selecting 500 the history-based candidate of history list 502 shall neither mean that the concept of FIG. 21 is restricted to cases where at least two candidate primitives precede the history-based candidate primitive in population order, nor that cases may occur where less than two candidates 192 are already present in list 190 at the time of selecting 500 the history-based candidate for list 190.

FIG. 21 depicts the situation at the time of deriving the history-based motion information predictor candidate primitive, namely selecting 500 the history-based motion information predictor candidate using with the next free entry 506 in the candidate list 190 is to be filled. In particular, FIG. 21 illustrates the motion information defined by the candidates 192 by which list 190 is populated so far, A and B, and the motion information in the entries 504 of history list 502, indicated as encircled 1 to encircled 5 in FIG. 21, in form of motion vectors. To ease the understanding of the concept of FIG. 21, all motion vectors A, B and 1-5 are indicated exemplarily as referring to the same reference picture 12b, but it should be clear for a man skilled in the art that this is not necessarily the case and that the motion information of each candidate 192 and entry 504 may actually comprise a reference picture index indexing the reference picture to which the respective motion information refers, and this index may vary among candidates 190 and entries 504, respectively.

Instead of simply choosing the most recently entered motion information in history list 502, encoder and decoder use the motion information predictor candidates 192 already present in list 190 at the time of performing selection 500. In case of FIG. 21, these are motion information predictor candidates A and B. In particular, in order to perform selection 500, encoder and decoder determine a dissimilarity for each entry 504 in the history list 502, with respect to the motion information predictor candidates 192 using which list 190 has already been populated before selection 500. The dissimilarity may, for instance, depend on a motion vector difference between the respective motion information 504 in history list 502 on the one hand and the motion information predictor candidate(s) 192 in list 190 the other hand. In case of more than one candidate 192 being present in list 190, the minimum of the distances of a respective motion information 504 in list 502 on the one hand and the candidates 192 in list 190 on the other hand, may, for instance, be used to determine the dissimilarity. The differences are exemplarily illustrated in FIG. 21 with respect to motion information 1 in list 502 by use of double headed arrows. The dissimilarity may, however, also depend on differences in reference picture index.

Different possibilities exist as to how to use the dissimilarity in performing selection 500. Generally speaking, the aim is to perform selection 500 in a manner so that the selected motion information 504 out of list 502 is sufficiently distinct from the motion information predictor candidates 192 using which list 190 has been populated so far. Accordingly, the dependency is designed in a manner so that a likelihood to be selected in higher for a certain motion information 504 in history list 502, the higher its dissimilarity to the motion information predictor candidates 192 already existing in list 190 is. For instance, the selection 500 could be done in a manner so that the selection depends on the dissimilarity as well as the rank of the respective motion information 504 at which the respective motion information 504 has been entered into history list 502. For instance, the arrow 508 in FIG. 21 shall indicate the order at which the motion information 504 has been entered into list 502, namely that the entries on top of list 502 have been entered more recently than the entries at the bottom thereof. According to a specific embodiment, for instance, encoder and decoder exclude motion information entries 504 from history list 502, the motion information of which is less than a predetermined threshold dissimilar from the motion information predictor candidate(s) 192 using which list 190 has been populated so far. For doing this, encoder and decoder may use the aforementioned examples for a distance measure depending on, for instance, motion vector differences and/or reference picture index differences, and threshold the resulting dissimilarity against some predetermined threshold parameter. The result of this procedure is an exclusion of certain motion information entries 504 from list 502 so that merely a subset of the motion information entries remains from which the selection 500 may then be done by using the most recently entered motion information entry to form the motion information predictor candidate to be entered into list 190 at position 506. The procedure might be repeated in case of list 190 having, in rank order, another candidate position which has to be populated using history list 502. In that case, it might be that the aforementioned threshold parameter is lowered so as to result into a less strict exclusion of motion information entries in list 502. That is, more similar motion information is admitted to result into the subset of motion information entries out of list 502, out of which the next motion information predictor candidate for list 190 is then selected as the one most recently having been entered into history list 502. Naturally, other possibilities exist of performing selection 500 in a manner depending on the dissimilarity of the motion information entries 504 in list 502 on the motion information predictor candidate(s) 192 using which the candidate list 190 has been populated so far.

In effect, the concept of FIG. 21 leads to a motion information predictor candidate list 190 for enter-predicted block 104 which collects motion information predictor candidate 192 which, owing to their increased mutual dissimilarity, increase the likelihood for the encoder to find a, in terms of great distortion optimization, optimum candidate out of this list 190. Then encoder may then signal the selected candidate out of list 190 for block 104 in data stream 14 by way of the respective pointer 193 along with a certain prediction residual 194.

Naturally, the aforementioned possibility is not restricted to a history-based motion information predictor candidate selected out of a history list 502. Rather, the process may also be used to perform a selection out of another reservoir of possible motion information predictor candidates. For instance, a subset of motion information predictor candidates may be selected out of a larger set of motion information predictor candidates in the manner described with respect to FIG. 21.

In other words, state-of-the-art is the procedure to add the available HMVP candidates solely on the criterium that none of the existing list candidates matches the potentially to be added HMVP candidate in horizontal and vertical components and reference index. In an effort to increase quality of the HMVP candidates added to a motion vector candidate list such as the merge candidate list or the sub-block motion vector candidate list, the list insertion of each HMVP candidate is based on an adaptive threshold. For instance, given that a motion vector candidate list is already filled with the spatial neighbor A and the further candidates B and Col are not available, for the next unoccupied list entry and before adding the first eligible HMVP candidate, the difference between eligible HMVP candidates and the existing list entries (A in the given example) is measured. Only if a threshold is met, the respective HMVP candidate is added and, otherwise, the next eligible HMVP is tested and so on. The above difference measure may incorporate the MV horizontal and vertical component as well as the reference index. In one embodiment, the threshold is adapted with each HMVP candidate, e.g. the threshold is lowered.

Figure 22:
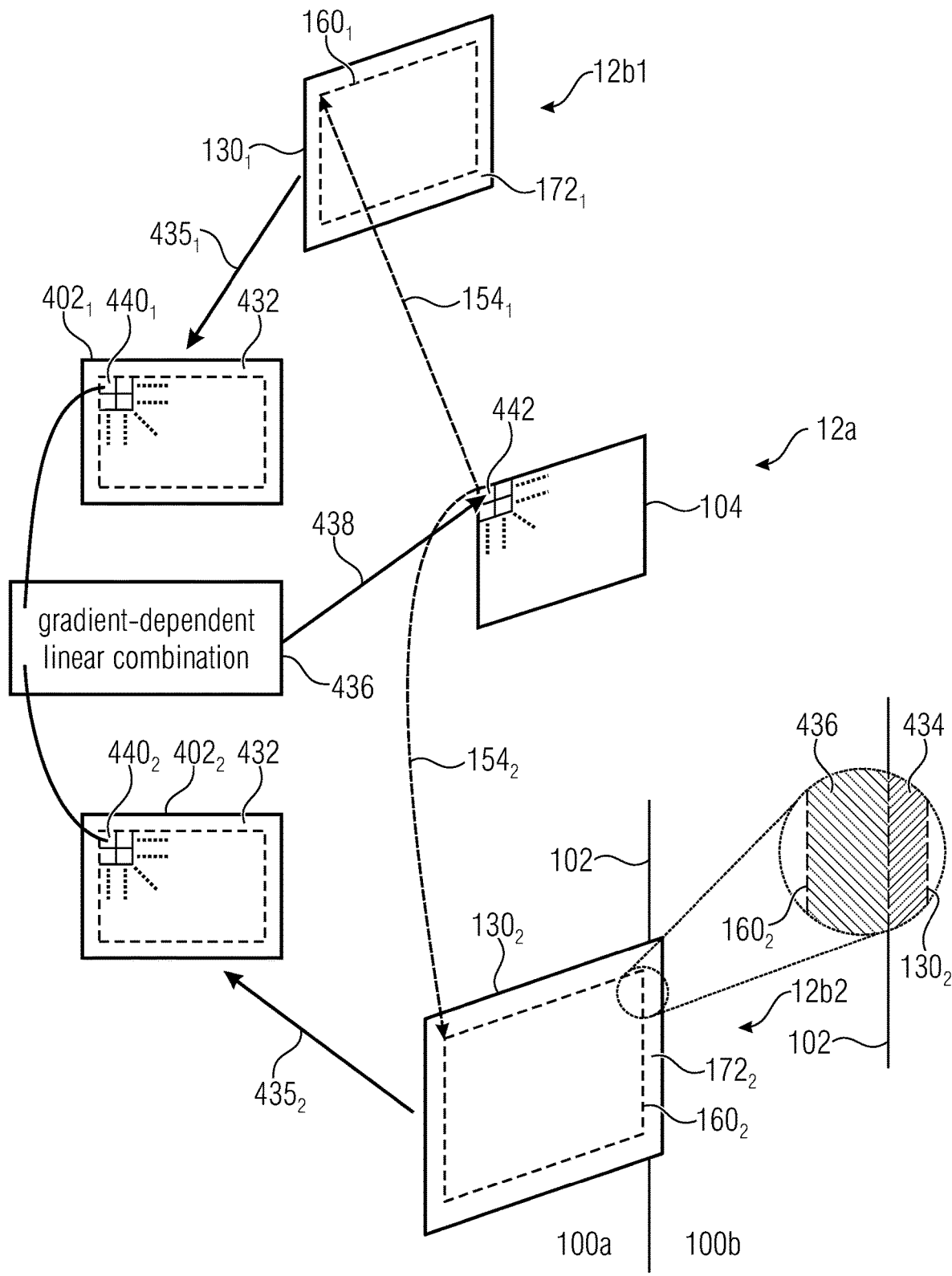
FIG. 22 shows a schematic diagram illustrating the functionality of a BIO (Bi-directional Optical Flow) tool built into encoder and decoder according to an embedment, for illustrating different concepts for the decoder assisting in attaining the tile independence constraint.

Lastly, FIG. 22 relates to a case where a codec uses a bi-directional optical flow tool for improving motion-compensated bi-directional prediction. FIG. 22 shows a bi-predictively coded block 104. Two motion vectors $154_1$ and $154_2$ are signaled in the data stream for block 104, one relating to reference picture $12b_1$, the other to reference picture $12b_2$. The footprint of block 104 within reference pictures $12b1$ and $12b2'$, when displaced according to the respective motion vector $154_1$ and $154_2$, is indicated in FIG. 22 at $160_1$ and $160_1$, respectively. The BIO tool determines a luminance gradient direction locally across the block's 104 area in order to combine the two hypotheses derived from the corresponding patches $130_1$ and $130_2$ in reference pictures $12b_1$ and $12b_2$. Using these luminance gradient directions, the BIO tool changes the manner at which block 104 is predicted from the two reference pictures $12b_1$ and $12b_2$, respectively, in a manner varying across block 104. The BIO tool results in the patches $130_1$ and $130_2$ being widened relative to block's 104 size not only in case of the respective motion vector $154_1$ or $154_2$ being a sub-pel motion vector and/or using a interpolation filter, but also in case of being a full-pel vector.

In both cases, an additional widening by a n-sample wide extension, with n being an integer with n>0 such as one, widens the patch. This is the consequence of the BIO tool's behavior: In order to be able to determine the local luminance gradient, the BIO tool derives from each of patches $130_1$ and $130_2$ a respective hypothesis block $402_1$ and $402_2$ which is widened relative to the block's 104 size by the just-mentioned n-sample wide extension edge portion, indicated by reference sign 432 in FIG. 22. In order to generate the widened hypothesis blocks $402_1$ and $402_2$, the extension edge portions 1721 and 1722 of patches $130_1$ and $130_2$ accommodate, at least, a corresponding n-sample wide widening 434 compared to the block's 104 width and, if the corresponding motion vector $154_1$ and $154_2$ is a sub-pel motion vector, additionally a widening 436 by a width corresponding to the interpolation filter's kernel reach. n is, thus, quasi a sample width or extension associated with the bi-directional optical flow tool. In FIG. 22, it is exemplarily assumed that motion vector $154_2$ was a sub-pel vector so that the BIO tool derives hypothesis block $402_2$ from patch $130_2$ by interpolation $435_2$ while in case of motion vector $154_1$ being a full-pel motion vector BIO tool may derive block $402_1$ by way of sample copying $435_1$ only. The BIO tool then determines a local luminance gradient across the hypothesis bocks $402_1$ and $402_2$ in order to use the determined gradients in block $402_1$ and block $402_2$, respectively, in order to combine both hypotheses, i.e. the hypothesis predictor $402_1$ gained from the reference picture $12b_1$ and the predictor $402_2$ gained from reference picture $12b_2$, within the block's 104 area $160_1$ and $160_2$ by way of a linear combination 436 in a manner varying over the block's area depending on the local gradient to obtain the final bi-predictive predictor 438 for block 104. In particular, for each sample 442 of block 104 the corresponding samples $440_1$ and $440_2$ in blocks $402_1$ and $402_2$ are added, weighted by a respective hypothesis weight such as ½ each or weighted by other weights the sum of which may, optionally, sum-up to yield one, with then adding a constant which depends on the luminance gradient determined for the corresponding samples $440_1$ and $440_2$ in blocks $402_1$ and $402_2$, to derive the respective sample 442. This is done by encoder and decoder both of which have the BIO tool.

It might be, that as far as the widening 436 is concerned, i.e. as far as the widening owing to the interpolation, the encoder takes care that none of the patches $130_1$ and $130_2$ crosses boundary 102, with or without the above described decoder's tile independency constraint enforcement with respect to motion vector predictors used to code motion vectors $154_1$ and $154_2$ into the data stream, or, alternatively, that the decoder performs tile independency constraint enforcement with respect to the final motion vectors $154_1$ and $154_2$ itself. An extension of patches $130_1$ and $130_2$ beyond boundary 102 by an mount less than or equal to the sample width n associated with the bi-directional optical flow tool would, however, still be possible. However, both encoder and decoder check whether the additional n-sample wide extension 434 causes any of patches 1031 and $130_2$ to nevertheless cross boundary 102. If this is the cases, video encoder and video decoder deactivate the BIO tool. Otherwise, the BIO tool is not deactivated. Accordingly, no signaling in the data stream is necessary to control the BIO tool. In FIG. 22, it is illustrated, that patch $130_2$ crosses boundary 102 of the current tile 100a towards the neighboring tile 100b. Accordingly, BIO tool would, here, be deactivated, as the decoder and encoder recognize that the patch $130_2$ crosses boundary 102. Just as a side, it is recalled that, as described above with respect to FIG. 11, the decoder could also account for the n-sample widening 434 in clipping the motion vectors 154 so that a tile boundary aware BIO tool deactivation would not be necessary.

For example, in case of BIO being deactivated, each sample 442, Sample (x,y), is derived as a simple weighted sum of the corresponding samples $440_1$ and $440_2$ of the hypothesis blocks $402_1$ and $402_2$, predSamplesL0[x][y] and predSamplesL1[x][y]:

Sample(x,y)=round(0.5*predSamplesL0[x][y]+0.5*pred-SamplesL1[x][y])

For all (x,y) of the current predicted block.

With BIO tool being activated, this changes to

Sample(x,y)=round(0.5*predSamplesL0[x][y]+0.5*pred-SamplesL1[x][y]+bioEnh(x,y))

For all (x,y) of the current predicted block 104 bioEnh(x,y) is an offset computed with the gradient of each corresponding reference sample $440_1$ and $440_2$ of each of the two references $402_1$ and $402_2$.

Alternatively, the decoder uses boundary paddings as to fill the surrounding 432 of the footprints 402 and 402' by which same are extended to result into patches 430 and 430' which extend beyond the boundary 102 into neighboring tiles.

In other words, in a usage scenario involving independently coded spatial segments such as MCTS, the above described BIO procedure needs to be restricted to avoid dependencies between MCTS.

As part of the just described embodiment, the case in which an initial unrefined reference block is located at positions at the boundary of the spatial segment in the respective picture, so as to involve samples outside the spatial segment into the used gradient calculation procedure, BIO is deactivated.

Alternatively, in this case, the outside of the spatial segment is extended through boundary padding procedures such as repeating or mirroring sample values at the spatial segment boundaries or a more advanced padding mode. This padding would allow the gradient calculation to be carried out without using samples of neighbouring spatial segments.

The following final note shall be made with respect to the above-presented embodiments an concepts. As noted several times throughout the description of the various embodiments and concepts, same may be used and implemented in a certain video codec individually or concurrently. Further, the fact that in many figures, the motion information described therein has been illustrated as containing a motion vector, shall only be interpreted as a possibility and shall not restrict embodiments which did not specifically make use of the fact that the motion information contained a motion vector. For instance, the tile boundary dependent motion information derivation on the side of the decoder explained with respect to FIG. 8 is not restricted to motion vector based motion information. With respect to FIG. 9, it should be noted that the application of the decoder's tile-independency constraint enforcement to motion information depicted therein is neither restricted to motion vector based kind of motion information nor to predictive coding of motion information which has been presented in FIG. 10. With feedback to FIG. 11, examples have been presented which may cause the patch to be larger than the footprint of the inter-predicted block. Embodiments of the present application described with respect to the various figures may, however, also related to codecs where such enlargement does, for instance, not occur, except for those embodiments which specifically refer to the circumstance. The embodiments of FIGS. 12a and 12b, for instance, specifically referred to this circumstance. With respect to FIG. 13, the concept of applying tile-independency constraint enforcement to motion information prediction or motion information predictors has been presented. It should be noted, however, that although FIG. 13 illustrated this concept with respect to the usage/establishment of a motion information predictor candidate list, this concept may also be applied to codecs not establishing a motion information predictor candidate list for an inter-predicted block. That is, simply one motion information prediction/predictor may be derived for a block 104 in the manner using tile-independency constraint enforcement. Insofar, however, FIGS. 13 and 14 represent an embodiment which may be modified to refer to just one motion information predictor. Further, it has already been noted above, that all the details regarding the enforcement described with respect to the previous figures, namely in particular, FIGS. 11, 12a and 12b may be used to specify and implement in more detail the embodiment of FIGS. 13 and 14. With respect to FIG. 15, and embodiment/concept has been presented according to which the availability of motion information predictor candidates is rendered dependent on whether same cause a tile-independency constraint conflict or not. It should be noted that this concept may be mixed-up with the embodiment of FIGS. 13 and 14 in that, for instance, certain motion information predictor candidate (primitive)'s are determined using tile-independency constraint enforcement and some are subject to the availability derivation dependent on whether or not the respective candidate cause a tile-independency constraint conflict. Further, the embodiment of FIG. 15 may be combined with applying tile-independency constraint enforcement on decoder side as described before with respect to FIG. 9, for instance. In all embodiments referring to, or making use of, a motion information predictor candidate list, the concept of FIG. 16 may be used according to which the determination of a temporal motion information predictor candidate is made in a manner dependent on whether the current block adjoins certain sides of the current tile or not, and the population order is changed dependent on whether the current block adjoins certain sides of the current tile with respect to this temporal motion information predictor candidate. FIG. 17 provides details. Again, this concept of FIGS. 16 and 17 may be combined with applying decoder side tile-independency constraint enforcement on the final state motion information and/or the predictor(s) as well as the availability control according to FIGS. 12 and 14. The latter statement is also true, the concept of deriving a temporal motion information predictor candidate according to FIG. 18. This concept is combinable with all the concepts mentioned as being combinable with the concept of FIGS. 16 and 17, and even a combination of the concepts of FIGS. 16 and 17 on the one hand and FIG. 18 on the other hand is feasible. As FIG. 19 represents an alternative figure to FIG. 18, the statement done with respect to FIG. 18 also relates to FIG. 19. FIGS. 18 and 19 may, in particular, also be used if merely one motion information predictor is determined for a block, i.e., without the establishment of a candidate list. With respect to FIG. 20, it should be noted that the mode underlying this concept, namely the affine motion model mode, may represent one mode of a video codec in addition to ones described, for instance, with respect to all the other embodiments described herein, or may represent the only inter-prediction mode of a video codec. In other words, the motion information represented by vectors 306a and 306b may be one entered into the candidate list mentioned with respect to any other embodiment, or represent the only predictor for block 104. The variability increasing concept for increasing the variability of motion information contained in a candidate list presented with respect to FIG. 21 may, as described above, be combined with any of the other embodiments and is, in particular, not restricted to a history-based motion information predictor candidate. With respect to the bio-tool embodiment described with respect to FIG. 21, a similar statement is done with respect to the affine motion model embodiment of FIG. 20 is true. With respect to all embodiments described herein, it is noted that as ones indicated with respect to FIG. 21, if more than one motion information predictor candidate is derived for block 104, same not necessarily referred to the same reference picture 12b with this not only being true for B-predictive blocks as outlined in FIG. 22. Further, the above description primarily focused on boundaries between neighbouring tiles 100a and 100b, i.e., boundaries leading through a picture. It should be noted, however, that the specifics outlined above may also be transferred onto tile boundaries coinciding with picture boundaries, i.e., boundaries of tiles adjoining the picture circumference. Even for these boundaries, the aforementioned decoder side tile-independency constraint enforcements may be established, for instance, or the availability constraints may be applied and so forth. And even further, in all of the above presented embodiments, it might be that the video codec contains a flag in the data stream indicating whether the sort of tile-independency constraint is used for coding the video or not. That is, the video codec may signal to the decoder whether or not the decoder shall apply the specific constraints or not and whether the encoder has applied the encoder side constraint surveillance or not.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded video signal or data stream, respectively, can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A video decoder comprising at least one processor configured to:
    identify a location of a current block within a current picture, wherein the current picture is one of a sequence of pictures in temporal presentation order;
    derive motion information for the current block by adding a temporal motion vector, MVTemp, to the location of the current block within the picture;
    determine that the motion information extends beyond a boundary of an independently coded spatial region within a reference picture, the reference picture preceding the current picture in the temporal presentation order;
    in response to the determination, clip the motion information;
    identify a location of a co-located block within the reference picture based on the clipped motion information, wherein the co-located block is within the independently coded spatial region of the reference picture;
    determine a motion vector for the co-located block in the reference picture; and
    predict the current block based on the motion vector from the co-located block.

2. The video decoder of claim 1, wherein the at least one processor is further configured to scale the motion vector from the co-located block according to temporal differences of involved pictures.

3. The video decoder of claim 1, wherein the motion information is clipped to be within CTU boundaries of the current block.

4. The video decoder of claim 1, wherein the at least one processor is further configured to decode a reference picture index for the reference picture from a data stream.

5. The video decoder of claim 1, wherein the at least one processor is further configured to decode a motion vector prediction residual from a data stream.

6. The video decoder of claim 1, wherein the independently coded spatial region is a tile.

7. The video decoder of claim 1, wherein the at least one processor is further configured to select the predicted a motion vector as a selected candidate from a motion vector candidate list based on an index from a data stream.

8. The video decoder of claim 7, wherein the at least one processor is further configured to add a motion vector prediction residual from the data stream to the selected candidate to produce a motion vector for the current block.

9. A method for video decoding, the method comprising:
    identifying a location of a current block within a current picture, wherein the current picture is one of a sequence of pictures in temporal presentation order;
    deriving motion information for the current block by adding a temporal motion vector, MVTemp, to the location of the current block within the picture;
    determining that the motion information extends beyond a boundary of an independently coded spatial region within a reference picture, the reference picture preceding the current picture in the temporal presentation order;
    in response to the determination, clipping the motion information;
    identifying a location of a co-located block within the reference picture based on the clipped motion information, wherein the co-located block is within the independently coded spatial region of the reference picture;
    determining a motion vector for the co-located block in the reference picture; and
    predicting the current block by based on the motion vector from the co-located block.

10. The method of claim 9, further comprising scaling the motion vector from the co-located block according to temporal differences of involved pictures.

11. The method of claim 9, wherein the motion information is clipped to be within CTU boundaries of the current block.

12. The method of claim 9, further comprising decoding a reference picture index for the reference picture from a data stream.

13. The method of claim 9, further comprising decoding a motion vector prediction residual from a data stream.

14. The method of claim 9, wherein the independently coded spatial region is a tile.

15. The method of claim 9, further comprising selecting a motion vector as a selected candidate from a motion vector candidate list based on an index from a data stream.

16. The method of claim 15, further comprising adding a motion vector prediction residual from the data stream to the selected candidate to produce a motion vector for the current block.

17. A non-transitory digital storage medium having computer program instructions stored thereon, that when executed causes at least one processor to:
    identify a location of a current block within a current picture, wherein the current picture is one of a sequence of pictures in temporal presentation order;
    derive motion information for the current block by adding a temporal motion vector, MVTemp, to the location of the current block within the picture;
    determine that the motion information extends beyond a boundary of an independently coded spatial region within a reference picture, the reference picture preceding the current picture in the temporal presentation order;

in response to the determination, clip the motion information;

identify a location of a co-located block within the reference picture based on the clipped motion information, wherein the co-located block is within the independently coded spatial region of the reference picture;

determine a motion vector for the co-located block in the reference picture; and predicting the current block based on the motion vector from the co-located block.

18. The non-transitory digital storage medium of claim 17, further comprising instructions that when executed cause the at least one processor to scale the motion vector from the co-located block according to temporal differences of involved pictures.

19. The non-transitory digital storage medium of claim 17, wherein the motion information is clipped to be within CTU boundaries of the current block.

20. The non-transitory digital storage medium of claim 17, further comprising instructions that when executed cause the at least one processor to decode a reference picture index for the reference picture from a data stream.

* * * * *